US008316320B2

(12) United States Patent
Relyea et al.

(10) Patent No.: US 8,316,320 B2
(45) Date of Patent: Nov. 20, 2012

(54) EXPANDABLE HISTORY TAB IN INTERACTIVE GRAPHICAL USER INTERFACE SYSTEMS AND METHODS

(75) Inventors: Don Relyea, Dallas, TX (US); Brian Roberts, Frisco, TX (US); Heath Stallings, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1023 days.

(21) Appl. No.: 11/752,695

(22) Filed: May 23, 2007

(65) Prior Publication Data

US 2008/0082935 A1 Apr. 3, 2008

Related U.S. Application Data

(63) Continuation-in-part of application No. 11/542,402, filed on Oct. 3, 2006.

(60) Provisional application No. 60/879,003, filed on Jan. 5, 2007.

(51) Int. Cl.
*G06F 3/048* (2006.01)

(52) U.S. Cl. ........ 715/817; 715/818; 715/819; 715/820; 725/46

(58) Field of Classification Search .................. 715/712, 715/713, 775–777, 817–820, 828, 841–843; 725/46
See application file for complete search history.

(56) References Cited

U.S. PATENT DOCUMENTS

| | | | |
|---|---|---|---|
| 4,977,455 A | 12/1990 | Young | |
| 5,151,789 A | 9/1992 | Young | |
| 5,253,066 A | 10/1993 | Vogel | |
| 5,307,173 A | 4/1994 | Yuen et al. | |
| 5,335,079 A | 8/1994 | Yuen et al. | |
| 5,353,121 A | 10/1994 | Young et al. | |
| 5,382,983 A | 1/1995 | Kwoh et al. | |
| 5,479,266 A | 12/1995 | Young et al. | |
| 5,479,268 A | 12/1995 | Young et al. | |
| 5,499,103 A | 3/1996 | Mankovitz | |
| 5,512,963 A | 4/1996 | Mankovitz | |
| 5,515,173 A | 5/1996 | Mankovitz et al. | |
| 5,532,732 A | 7/1996 | Yuen et al. | |
| 5,532,754 A | 7/1996 | Young et al. | |
| 5,541,738 A | 7/1996 | Mankovitz | |
| 5,550,576 A | 8/1996 | Klosterman | |
| 5,553,123 A | 9/1996 | Chan et al. | |
| 5,559,550 A | 9/1996 | Mankovitz | |
| 5,600,711 A | 2/1997 | Yuen | |
| 5,619,274 A | 4/1997 | Roop et al. | |
| 5,640,484 A | 6/1997 | Mankovitz | |
| 5,671,398 A * | 9/1997 | Neubauer | 703/23 |
| 5,684,525 A | 11/1997 | Klosterman | |
| 5,701,383 A | 12/1997 | Russo et al. | |
| 5,706,145 A | 1/1998 | Hindman et al. | |
| 5,727,060 A | 3/1998 | Young | |
| 5,734,786 A | 3/1998 | Mankovitz | |
| 5,790,198 A | 8/1998 | Roop et al. | |
| 5,801,787 A | 9/1998 | Schein et al. | |

(Continued)

*Primary Examiner* — Robert Stevens
*Assistant Examiner* — Eric Wiener

(57) ABSTRACT

In one of many possible examples, a system includes a media content processing subsystem configured to successively display a plurality of history tabs configured to graphically represent and facilitate access to a corresponding plurality of hierarchical representations within a browsing thread. The media content processing subsystem is further configured to collapse at least two of the history tabs into an expandable history tab after a pre-determined number of the history tabs are displayed. The expandable history tab is configured to graphically represent and facilitate access to a plurality of the hierarchical representations within the browsing thread.

26 Claims, 19 Drawing Sheets

U.S. PATENT DOCUMENTS

| | | | |
|---|---|---|---|
| 5,808,608 A | 9/1998 | Young et al. | |
| 5,809,204 A | 9/1998 | Young et al. | |
| 5,812,205 A | 9/1998 | Milnes et al. | |
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,028,599 A | 2/2000 | Yuen et al. | |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,160,549 A * | 12/2000 | Touma et al. | 715/762 |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,348,935 B1 * | 2/2002 | Malacinski et al. | 715/853 |
| 6,380,957 B1 * | 4/2002 | Banning | 715/828 |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,421,072 B1 * | 7/2002 | Ku et al. | 715/804 |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,480,836 B1 * | 11/2002 | Colby et al. | 707/717 |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,594,653 B2 * | 7/2003 | Colby et al. | 1/1 |
| 6,668,133 B2 | 12/2003 | Yuen et al. | |
| 6,687,906 B1 | 2/2004 | Yuen et al. | |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,754,626 B2 * | 6/2004 | Epstein | 704/235 |
| 6,756,997 B1 | 6/2004 | Ward et al. | |
| 6,760,537 B2 | 7/2004 | Mankovitz | |
| 6,799,326 B2 | 9/2004 | Boylan et al. | |
| 6,799,327 B1 | 9/2004 | Reynolds et al. | |
| 6,816,175 B1 * | 11/2004 | Hamp et al. | 715/854 |
| 6,820,111 B1 * | 11/2004 | Rubin et al. | 709/203 |
| 6,850,693 B2 | 2/2005 | Young et al. | |
| 6,859,799 B1 | 2/2005 | Yuen | |
| 6,952,208 B1 * | 10/2005 | Arquie et al. | 345/440 |
| 6,983,426 B1 * | 1/2006 | Kobayashi et al. | 715/854 |
| 7,039,935 B2 | 5/2006 | Knudson et al. | |
| 7,062,475 B1 * | 6/2006 | Szabo et al. | 706/11 |
| 7,069,576 B1 | 6/2006 | Knudson et al. | |
| 7,088,374 B2 * | 8/2006 | David et al. | 345/619 |
| 7,124,369 B2 * | 10/2006 | Beaudoin | 715/738 |
| 7,130,846 B2 | 10/2006 | Danker et al. | |
| 7,210,093 B1 | 4/2007 | Dutta | |
| 7,228,556 B2 | 6/2007 | Beach et al. | |
| 7,242,413 B2 * | 7/2007 | Chu et al. | 345/619 |
| 7,266,785 B2 * | 9/2007 | Grotjohn | 715/853 |
| 7,290,222 B2 * | 10/2007 | Guido et al. | 715/853 |
| 7,360,167 B2 * | 4/2008 | Hennum et al. | 715/772 |
| 7,360,175 B2 * | 4/2008 | Gardner et al. | 715/854 |
| 7,418,670 B2 * | 8/2008 | Goldsmith | 715/810 |
| 7,475,365 B2 * | 1/2009 | Nan et al. | 715/854 |
| 7,487,529 B1 | 2/2009 | Orlick | |
| 7,496,830 B2 * | 2/2009 | Rubin et al. | 715/206 |
| 7,506,350 B2 | 3/2009 | Johnson | |
| 7,533,355 B2 * | 5/2009 | Aritomi | 715/853 |
| 7,571,156 B1 * | 8/2009 | Gupta et al. | 1/1 |
| 7,587,679 B1 * | 9/2009 | Sundermeyer et al. | 715/777 |
| 7,596,533 B2 * | 9/2009 | Szabo et al. | 706/11 |
| 7,600,185 B2 * | 10/2009 | Asakawa et al. | 715/246 |
| 7,600,243 B2 | 10/2009 | Brain et al. | |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0124255 A1 | 9/2002 | Reichardt et al. | |
| 2003/0005445 A1 | 1/2003 | Schein et al. | |
| 2003/0056219 A1 | 3/2003 | Reichardt et al. | |
| 2003/0093613 A1 * | 5/2003 | Sherman | 711/104 |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2004/0010806 A1 | 1/2004 | Yuen et al. | |
| 2004/0045025 A1 | 3/2004 | Ward et al. | |
| 2004/0093562 A1 * | 5/2004 | Diorio et al. | 715/513 |
| 2004/0107437 A1 | 6/2004 | Reichardt et al. | |
| 2004/0168189 A1 | 8/2004 | Reynolds et al. | |
| 2004/0194138 A1 | 9/2004 | Boylan et al. | |
| 2004/0194141 A1 | 9/2004 | Sanders | |
| 2004/0243938 A1 * | 12/2004 | Weise et al. | 715/526 |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0076312 A1 * | 4/2005 | Gardner et al. | 715/853 |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0216936 A1 | 9/2005 | Knudson et al. | |
| 2005/0251824 A1 | 11/2005 | Thomas et al. | |
| 2005/0257154 A1 * | 11/2005 | Bales et al. | 715/734 |
| 2005/0257172 A1 * | 11/2005 | Bales et al. | 715/853 |
| 2006/0026639 A1 | 2/2006 | Potrebic et al. | |
| 2006/0130098 A1 | 6/2006 | Rao et al. | |
| 2006/0156336 A1 | 7/2006 | Knudson et al. | |
| 2006/0212894 A1 | 9/2006 | Knudson et al. | |
| 2006/0253594 A1 * | 11/2006 | Szabo et al. | 709/227 |
| 2006/0277574 A1 | 12/2006 | Schein et al. | |
| 2006/0288366 A1 | 12/2006 | Boylan et al. | |

| | | | | | |
|---|---|---|---|---|---|
| 2007/0016926 A1 | 1/2007 | Ward et al. | 2008/0022308 A1 | 1/2008 | Garcea |
| 2007/0033613 A1 | 2/2007 | Ward et al. | 2008/0066135 A1 | 3/2008 | Brodersen et al. |
| 2007/0107010 A1 | 5/2007 | Jolna et al. | 2009/0024603 A1 | 1/2009 | Zink |
| 2007/0198930 A1* | 8/2007 | Chu et al. .................. 715/713 | | | |

* cited by examiner

US 8,316,320 B2

EXPANDABLE HISTORY TAB IN INTERACTIVE GRAPHICAL USER INTERFACE SYSTEMS AND METHODS

RELATED APPLICATIONS

The present application is a continuation-in-part application of U.S. patent application Ser. No. 11/542,402 by Heath Stallings et al., filed Oct. 3, 2006, and entitled INTERACTIVE SEARCH GRAPHICAL USER INTERFACE SYSTEMS AND METHODS, the contents of which are hereby incorporated by reference in their entirety. The present application also claims priority under 35 U.S.C. §119(e) to U.S. Provisional Patent Application No. 60/879,003 by Brian Roberts et al., filed on Jan. 5, 2007, and entitled USER INTERFACE FUNCTIONS FOR MEDIA CONTENT ACCESS SYSTEMS AND METHODS, the contents of which are hereby incorporated by reference in their entirety.

BACKGROUND INFORMATION

The advent of computers, interactive electronic communication, the Internet, and other advances in the digital realm of consumer information utilization have resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of two-way communication approaches that facilitate services such as video-on-demand, internet protocol television ("IPTV"), and personal video recording.

An STB is typically connected to a cable or satellite, or generally, a subscriber television system, and includes hardware and software necessary to provide enhanced options for a subscriber television system at a subscriber location. Conventional STBs include a processor, communication components, and memory and are connected to a television or other display device, such as a personal computer. While many STBs are stand-alone devices that are externally connected to a television, an STB and/or its functionality may be integrated into a television or personal computer, a mobile device such as a mobile phone or a personal digital assistant ("PDA"), or even into an audio device such as a programmable radio, as is known.

An STB is usually configured to provide users with a large number and variety of media content choices. For example, a user may choose to view a variety of broadcast television programs, pay-per-view services, video-on-demand programming, Internet services, and audio programming via an STB. A user may additionally or alternatively choose to communicate, shop, and/or otherwise interact with third parties via the STB.

However, the large number of options available via a STB often makes it difficult for an STB user to effectively manage and easily access those options. For example, it is often cumbersome to find and select a desired media content instance for viewing and/or access any of the other features of the STB. On-screen graphical user interfaces have alleviated this confusion to some degree. However, many on-screen user interfaces are difficult to use and therefore result in missed viewing opportunities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Exemplary systems and methods for providing a capability of searching and/or browsing through content that may be available via a media content processing subsystem are described herein. As used herein, the term "content" will be used to refer generally to any option, feature, media content instance, and/or directory thereof that is accessible via a media content processing subsystem.

The exemplary systems and methods described herein generally enable a user to easily, effectively, and intuitively search for and/or browse through content available via a media content processing subsystem. In some examples, a user may access and navigate through any content available via the media content processing subsystem simply by using the navigational buttons located on any user input device (e.g., a remote control).

In some examples, a media content processing subsystem, such as a set-top box ("STB"), is configured to display an interactive graphical user interface through which a user may search for and/or browse through content available via the media content processing subsystem. To this end, a list of selectable hierarchical representations (e.g., directories) may be displayed within the interactive graphical user interface. As the user selects successive hierarchical representations, a browsing thread or path is created and a plurality of history tabs are successively displayed. The history tabs are configured to graphically represent and facilitate access to a corresponding plurality of hierarchical representations within the browsing thread created by the user. After a pre-determined number of history tabs are displayed, at least two of the history tabs are collapsed into an expandable history tab. The expandable history tab is configured to graphically represent and facilitate access to a plurality of hierarchical representations within the browsing thread. In this manner, a user may easily return to a desired point within the browsing thread by selecting the expandable history tab and/or any of the other history tabs that are displayed within the interactive graphical user interface.

Components and functions of the exemplary systems and methods described herein will now be described in more detail.

II. Exemplary System View

Figure 1:
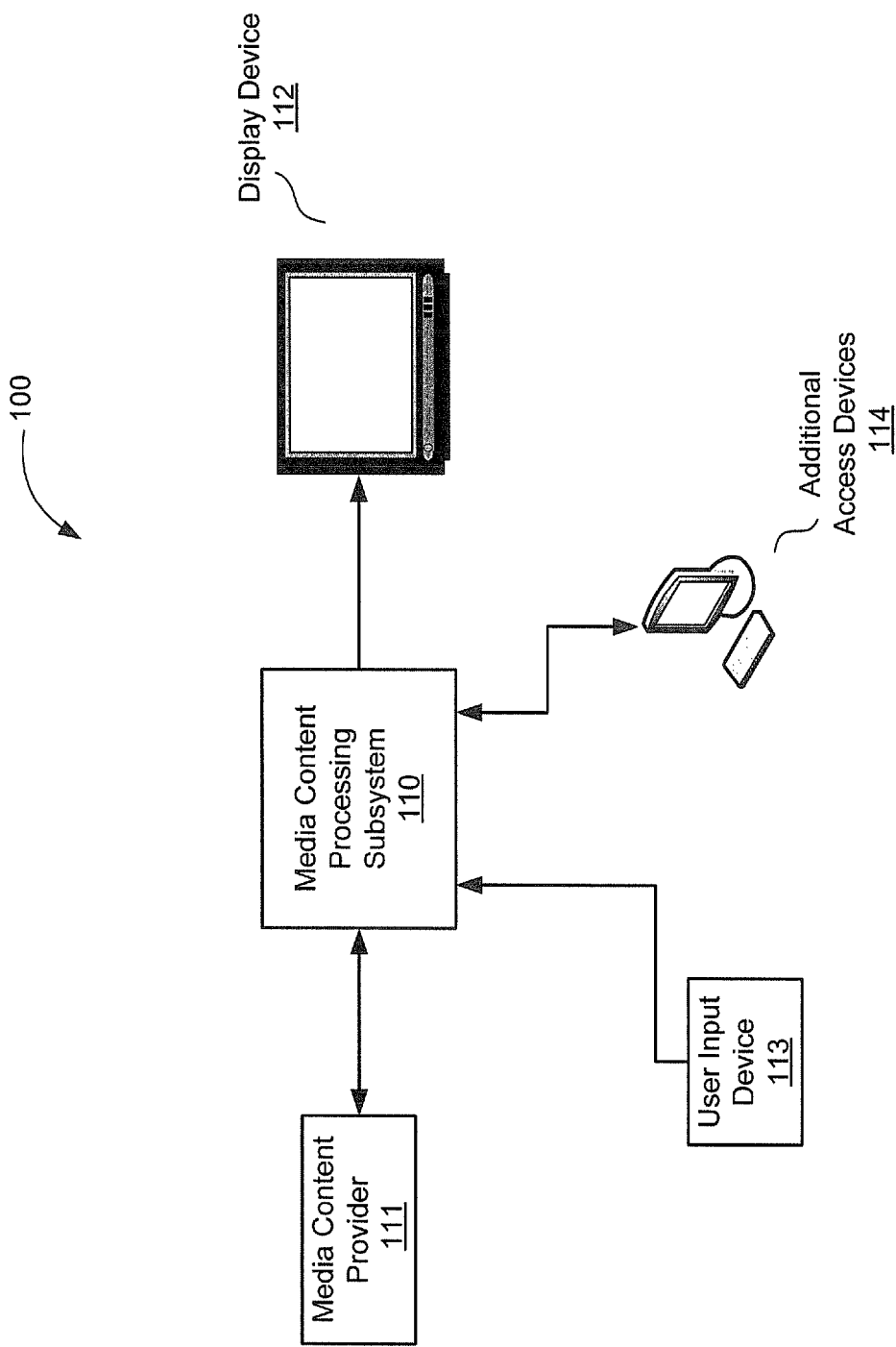
FIG. 1 illustrates an example of a media content access system according to principles described herein.

FIG. 1 illustrates an exemplary media content access system 100. Media content access system 100 may take many different forms and include multiple and/or alternate components and facilities.

As shown in FIG. 1, a media content processing subsystem 110 is configured to communicate with and receive a signal or data stream (e.g., a media content stream) containing a media content instance from a media content provider 111. As used herein, the term "media content instance" will be used to refer generally to any television program, on demand program, pay-per-view program, broadcast media program, IPTV commercial, advertisement, video, movie, song, image, photograph, sound, or any segment of these or other forms of media content that may be experienced or viewed by a user.

The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 may use any suitable technology or technologies to receive the media content instance from the media content provider 111, including using a tuner to receive the media content instance, as described below. The media content processing subsystem 110 may be configured to process the media content stream provided by the media content provider 111, including causing the media content instance, or one or more components (e.g., video and/or audio components) of the media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display device 112 (e.g., a television, computer monitor, etc.) so that the display device 112 may present (e.g., display) the media content instance for experiencing by the user.

As shown in FIG. 1, and as will be described in more detail below, the media content processing subsystem 110 may be controlled by a user input device 113 (e.g., a remote control device) and/or a number of additional access devices 114 (e.g., a personal computer, wireless device, mobile phone, etc.).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to audio-visual content (e.g., broadcast television programs, pay-per-view services, Internet Protocol Television ("IPTV"), Digital Video Disc ("DVD") related content, or video-on-demand programming), pre-recorded media content, data communication services such as Internet services, images, and audio programming.

Figure 2:
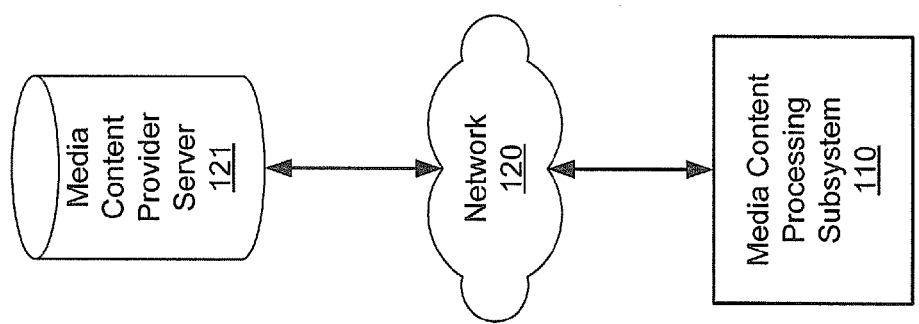
FIG. 2 is an illustration of an exemplary media content provider network according to principles described herein.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo®) network), an optical fiber network, or any other suitable network. In some alternative examples, the processing subsystem 110 may be connected directly to the media content provider server 121

B. Display Device

As mentioned, the processing subsystem 110 may be coupled to a display device 112 configured to present media content to a user. For example, the display device 112 may display or play the media content. The display device 112 may include, but is not limited to, a television, computer monitor, mobile phone, handheld device, or any other device configured to present media content to a user.

C. Media Content Processing Subsystem

Figure 3:
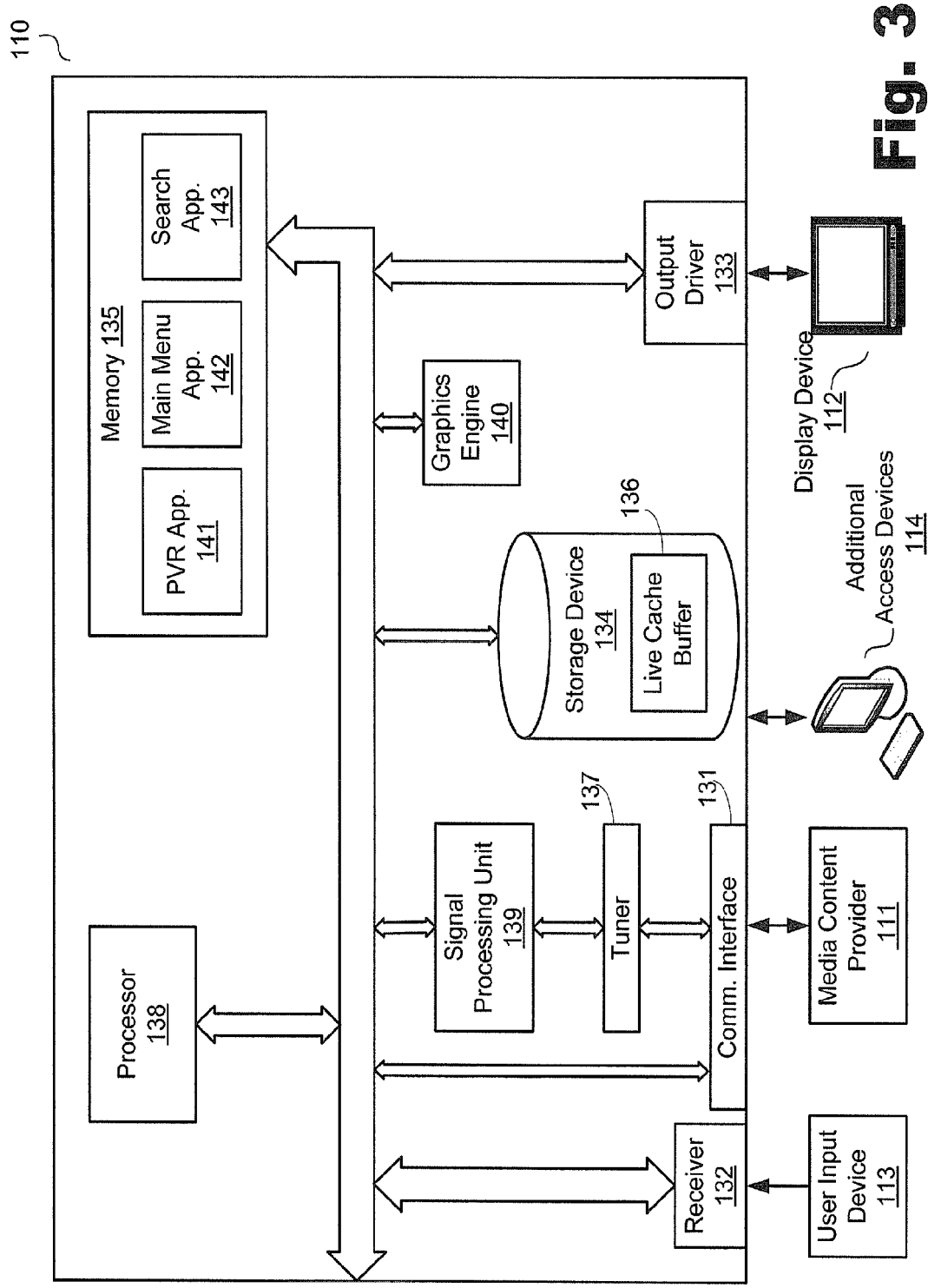
FIG. 3 is a block diagram of an exemplary media content processing subsystem according to principles described herein.

FIG. 3 is a block diagram of an exemplary media content processing subsystem 110 (or simply "processing subsystem 110"). The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible devices that receive and process digital and/or analog media content. Hence, an exemplary processing subsystem 110 may include, but is not limited to, a set-top box ("STB"), a home communication terminal ("HCT"), a digital home communication terminal ("DHCT"), a stand-alone personal video recorder ("PVR"), a television set, a DVD player, a video-enabled phone, and/or a personal computer.

In some examples, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive media content in any format from the media content provider 111 or from any other suitable media content source. The communication interface 131 may include any device, logic, and/or other technologies suitable for receiving signals and/or data representative of media content. In some examples, the communication interface 131 may include a single port configured to receive media content from the media content provider 111 and/or from any other source (e.g., from another processing subsystem, another server, etc.) For example, the communication interface 131 may include or be connected to a broadband connection, which can enable the processing subsystem 110 to receive media content on a single port from multiple sources. In other examples, multiple ports may be used. The communication interface 131 may be configured to interface with any suitable communication media, protocols, and formats, including any of those mentioned above.

The processing subsystem 110 may also include a receiver 132 configured to receive one or more input commands from one or more user input devices 113. An exemplary user input device 113 will be described in more detail below.

A number of additional access devices 114 may also be configured to communicate with the processing subsystem 110. These access devices 114 may include, but are not limited to, personal computers and mobile devices (e.g., laptops, PDAs, cellular phones, etc.). In some examples, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. Various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory (RAM), dynamic RAM (DRAM), or a combination thereof. In some examples, as will be described in more detail below, various applications used by the processing subsystem 110 may reside in memory 135.

As shown in FIG. 3, the storage device 134 may include one or more live cache buffers 136, The live cache buffer 136 may additionally or alternatively reside in memory 135 or in a storage device external to the processing subsystem 110. In some examples, media content data may be temporarily stored in the live cache buffer 136 to facilitate viewing of the media content in one or more trick play modes.

3. Tuner

Tuner 137 is configured to tune to a particular television channel, stream, address, frequency or other carrier (i.e., content carrier) in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether the media content is to be deleted. As used herein, the term "permanent recording" will be understood to mean media content that is stored for an extended period of time as decided by the user.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

In some examples, if the incoming media content is in the form of IP data packets (e.g., in IPTV configurations), the media content may be processed directly by the processor 138 and/or any other processor configured to process IP data packets.

The processing subsystem 110 may also include a graphics engine 140 configured to generate graphics that are to be displayed by the display device 112. The graphics may include graphical user interfaces ("GUIs") such as, but not limited to, one or more program guides, progress bars, and other graphics.

5. Application Clients

Returning to FIG. 3, one or more applications 141-143 residing within the processing subsystem 110 may be executed upon initiation by a user of the processing subsystem 110. The applications 141-143, or application clients, may reside in memory 135 or in any other area of the processing subsystem 110 and be executed by the processor 138. The applications 141-143 shown in FIG. 3 are merely illustrative of the many different applications that may reside within the processing subsystem 110.

As shown in FIG. 3, one of the applications may include a personal video recording ("PVR") application 141. A PVR application is also referred to as a digital video recording ("DVR") application. As used herein, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 141 may also provide for media content recording functionality by enabling the temporary and/or permanent recording of media content to the storage device 134.

The processing subsystem 110 may additionally or alternatively include a main menu application 142 configured to generate a main menu that is displayed on the display device 112. An exemplary main menu includes a GUI that performs various functions including allowing a user to access one or more options, features, and/or media content instances via the processing subsystem 110.

In some examples, the processing subsystem 110 additionally or alternatively includes a search application 143 configured to enable a user to search for a particular media content instance and/or information related to one or more media content instances. The search application 143 will be described in more detail below.

D. User Input Device

User input device 113 (or simply "input device 113") may include, for example, a remote control, keyboard, or any other suitable input device and may be configured to communicate with the receiver 132 via a wireless link, electrical connection, or any other suitable communication link.

Figure 4:
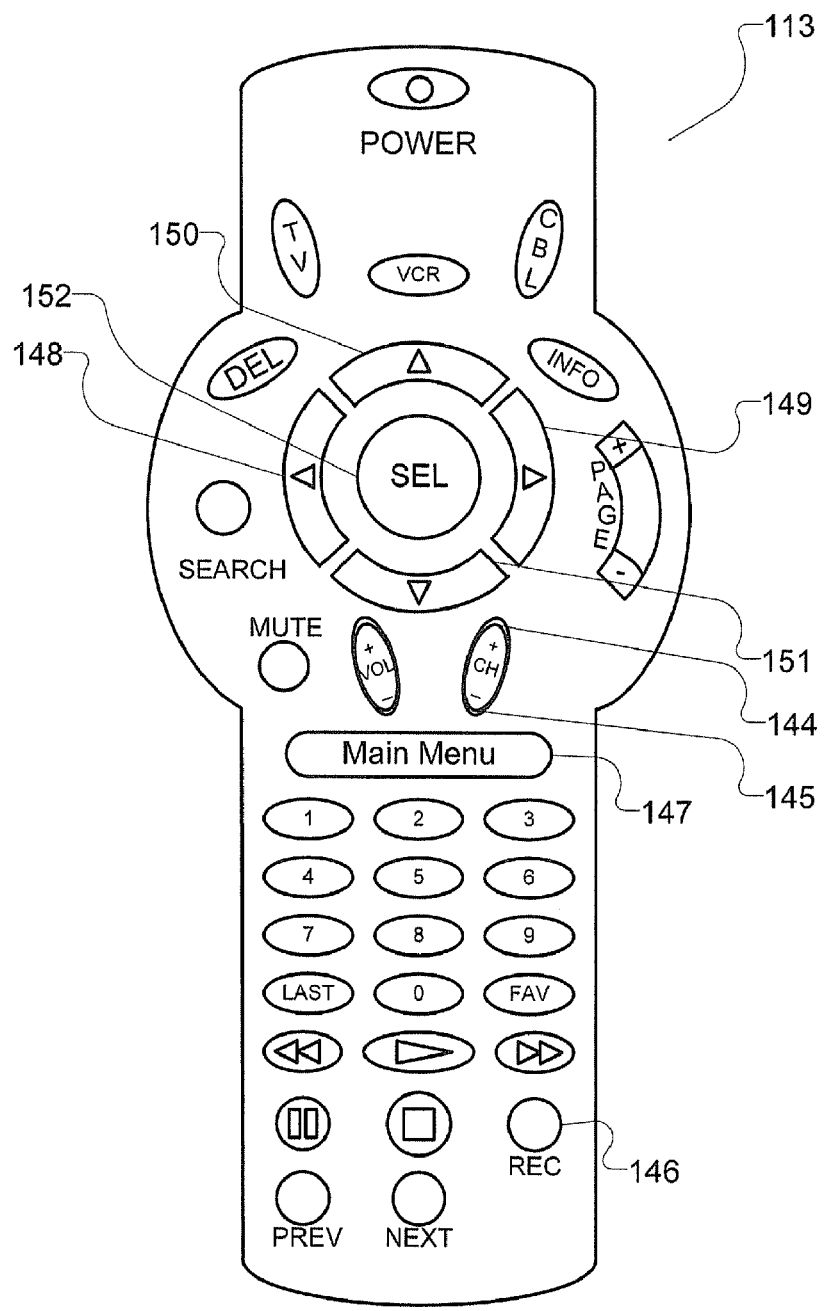
FIG. 4 illustrates an exemplary user input device according to principles described herein.

An exemplary remote control input device 113 is illustrated in FIG. 4. It will be recognized that the input device 113 shown in FIG. 4 is merely illustrative of the many different types of input devices that may be used in connection with the present systems and methods.

In some examples, the input device 113 may include any number of buttons or keys configured to enable a user to control various options related to media content available via the processing subsystem 110. For example, channel up and down buttons 144 and 145 enable a user to navigate to and between various media content instances. A record button 146 may also be included which enables the user to designate as permanently recorded any media content instance buffered in the live cache buffer 136. A main menu button 147 may be configured to evoke the display of a main menu GUI by the display device 112. Navigational buttons, such as a left arrow button 148, right arrow button 149, up arrow button 150, down arrow button 151, and select button 152 may also be included and configured to enable the user to evoke and/or navigate through various views and graphical user interfaces displayed by the display device 112.

Figure 5:
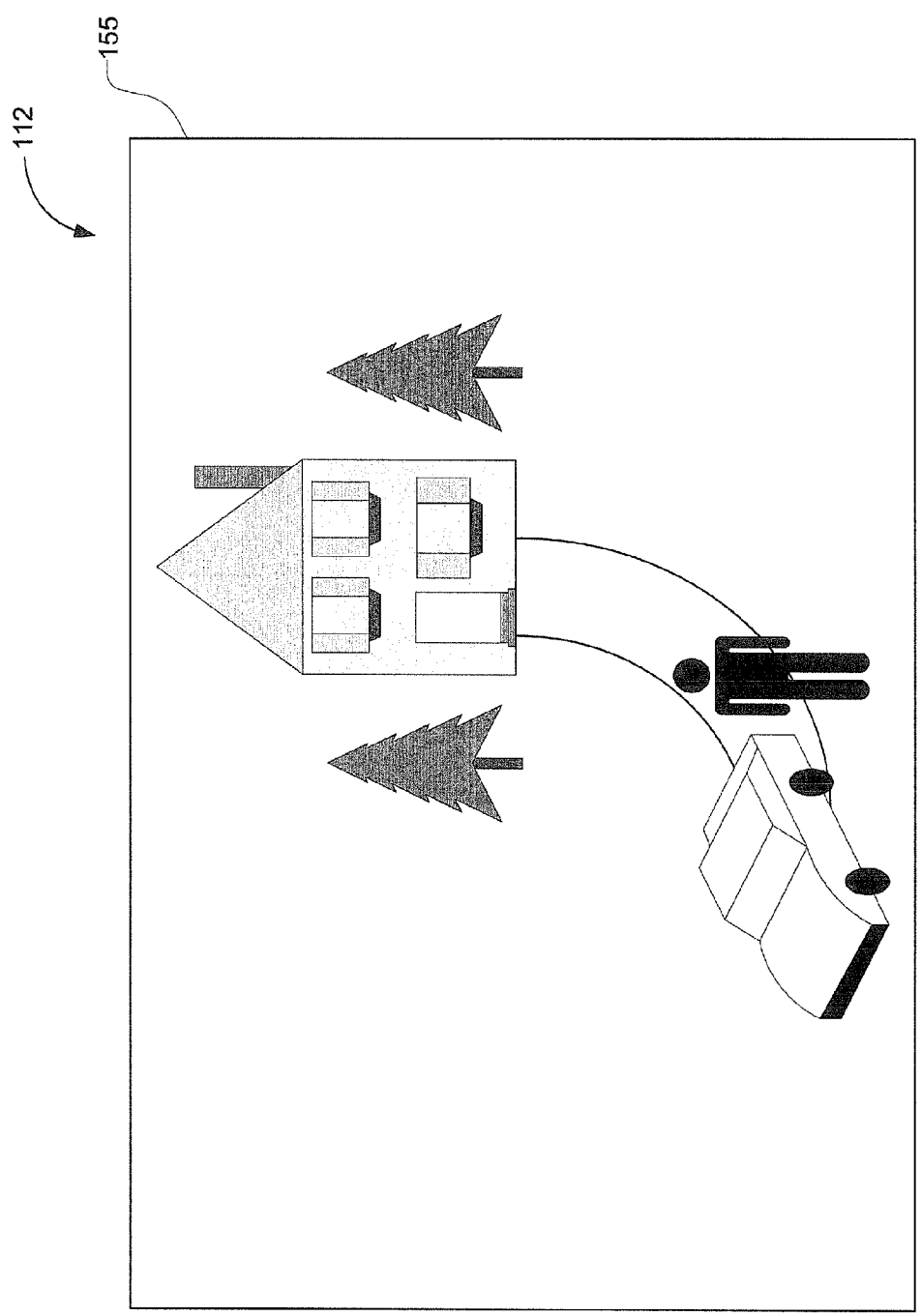
FIG. 5 illustrates a viewing screen of an exemplary display device with a particular scene or frame of media content displayed thereon according to principles described herein.

FIG. 5 illustrates a viewing area or screen 155 of an exemplary display device 112 with a particular scene or frame of a media content instance displayed thereon. In some examples, the user may be interested in experiencing a different media content instance and/or viewing information related to one or more other media content instances. The user may additionally or alternatively be interested in accessing various settings, communication mediums, purchasing venues, and/or any other option or feature of the media content processing subsystem 110.

However, there may be a relatively large number (e.g., thousands) of media content instances and/or options available via the processing subsystem 110. To this end, an interactive GUI may be displayed by the display device 112 that is configured to allow a user to easily and intuitively access and browse through content available via a media content processing subsystem 110. Such content may include, but is not limited to, one or more options, features, and/or media content instances available via the media content processing subsystem 110. As will be described in more detail below, the GUI may be configured to allow a user to access the content contained therein by using only the four directional arrow buttons 148-151 and the select button 152 that are a part of the user input device 113. However, it will be recognized that any other button that is a part of the input device 113 may additionally or alternatively be used to access content contained within the GUI.

Figure 6:
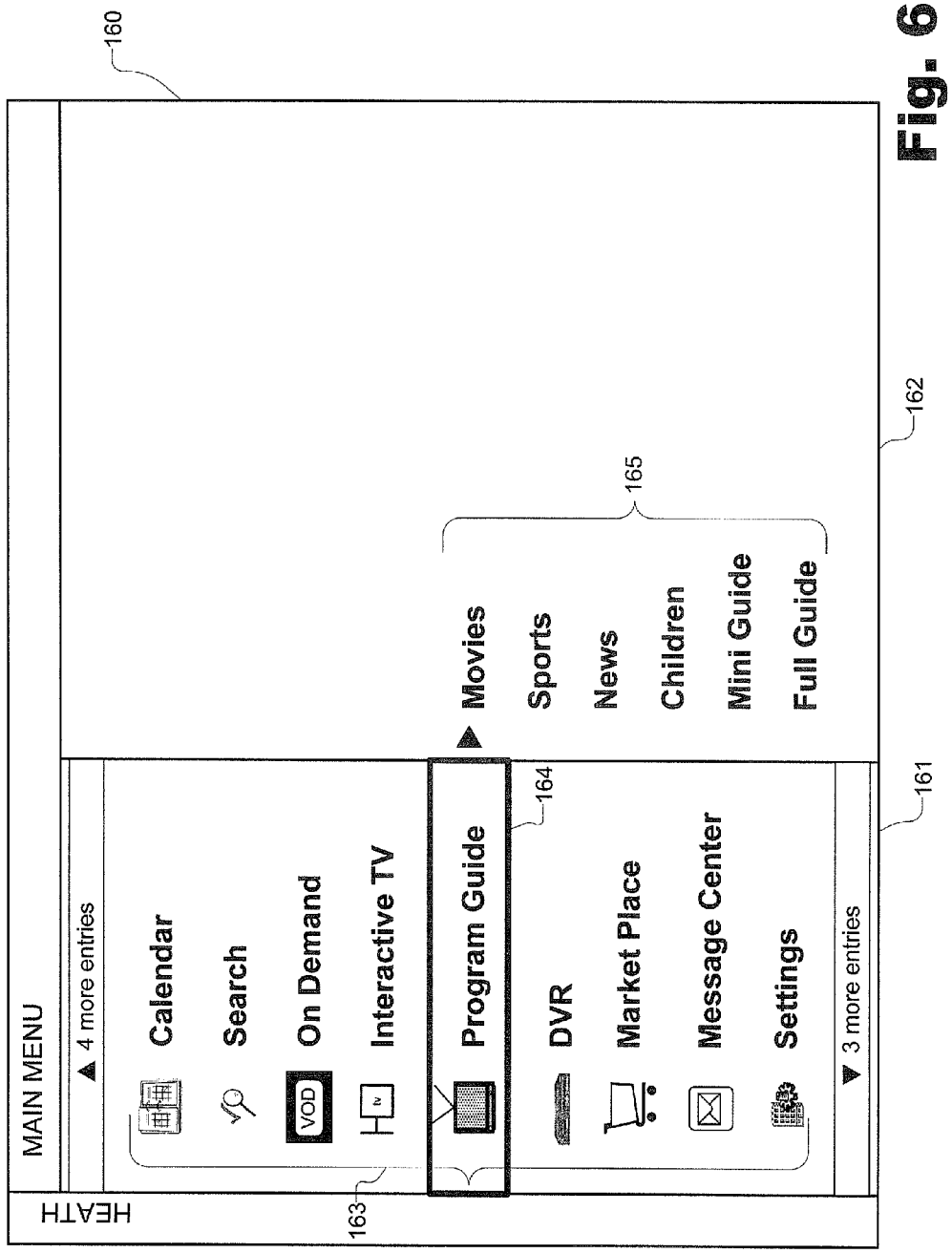
FIG. 6 illustrates an exemplary main menu graphical user interface ("GUI") according to principles described herein.

FIG. 6 illustrates an exemplary GUI 160 that may be displayed by the display device 112 and that may be used to facilitate access to content available via the media content processing subsystem 110. For illustrative purposes only, the GUI 160 will be referred to as a "main menu GUI 160" in many of the examples given herein. However, it will be recognized that the GUI 160 may be any other type of GUI as may serve a particular application.

The main menu GUI 160 of FIG. 6 may be evoked using a number of different methods. For example, the user may select a dedicated button on a user input device (e.g., the main menu button 147 on the user input device 113 or one of the arrow buttons 148-151 as illustrated in FIG. 4). Additionally or alternatively, the main menu GUI 160 may be evoked by selecting an option within any other GUI as may serve a particular application.

In some examples, the main menu GUI 160 of FIG. 6 may occupy substantially the entire viewing screen 155 of the display device 112. However, it will be recognized that the main menu GUI 160 may alternatively occupy only a portion of the viewing screen 155 such that a media content instance may be simultaneously displayed thereon.

As shown in FIG. 6, the main menu GUI 160 may include two interactive viewing panes, labeled 161 and 162 respectively. It will be recognized that the main menu GUI 160 may alternatively include any other number of viewing panes as may serve a particular application. In some examples, as will be described in more detail below, the contents of the second viewing pane 162 may be dynamically updated to display various entries related to a select entry within the first viewing pane 161

As shown in FIG. 6, the first viewing pane 161 may include a main menu listing 163 of selectable entries within a main menu directory, sub-directory, or folder. As used herein, the terms "directory", "sub-directory", and "folder" generally refer to a grouping of one or more related options, features, media content instances, and/or other content utilizing some form of a hierarchical representation.

Each entry within the main menu listing 163 corresponds to a directory of one or more options that may be accessed via the processing subsystem 110. For example, the main menu listing 163 may include entries configured to allow access to one or more of the following options or features: calendar options, search options, on demand programming options, interactive television options, program guide listings, DVR options, shopping options, messaging and communication options, settings, and help options. It will be recognized that the main menu listing 163 may include additional or alternative entries as may serve a particular application. For example, one or more customized entries may be included within the main menu listing 163 such as, but not limited to, a directory containing personalized media content (e.g., photos, music, videos, games, and contacts).

In some examples, one or more graphics corresponding to one or more of the entries within the main menu listing 163 may also be displayed within the first viewing pane 161. These graphics may be changed or removed by a user as desired.

In some examples, a user may browse through the main menu listing 163 with the up and down arrow buttons 150 and 151 as shown in FIG. 4, for example, and select a desired entry by pressing a designated button (e.g., the right arrow button 149 or the select button 152) when the desired entry is located within a "magnified area." As used herein, the term "magnified area" 164 will be used to refer to a fixed focus state or area within a viewing pane (e.g., the first viewing pane 161) that is in some way distinguished from the rest of the viewing pane 161. For example, as shown in FIG. 6, the magnified area 164 is surrounded by a distinguishing border. The magnified area 164 may additionally or alternatively include a distinct color, brightness, text size, and/or any other distinguishing feature.

In some alternative examples, an audible description of the entry within the magnified area 164 may be provided. Exemplary magnified areas are described in further detail in co-pending U.S. patent application Ser. No. 11/500,208, entitled "PROGRAM GUIDE GRAPHICAL USER INTERFACE SYSTEMS AND METHODS," filed Aug. 7, 2006, and incorporated herein by reference in its entirety.

Figure 7:
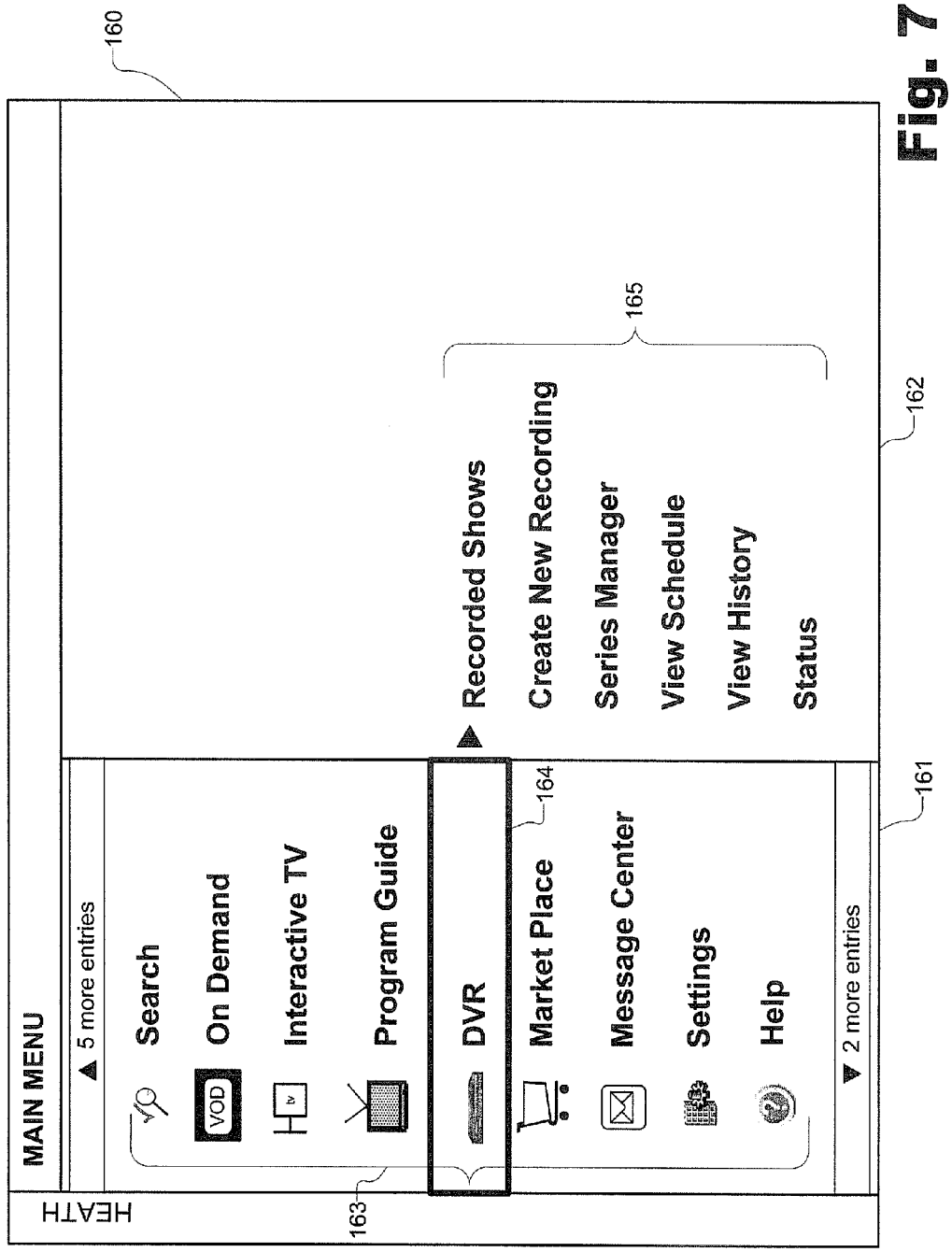
FIG. 7 shows another view of the exemplary main menu GUI according to principles described herein.

The magnified area 164 may be configured to remain stationary in relation to the scrolling main menu listing 163. Hence, as a user scrolls up or down through the main menu listing 163 of selectable entries, the entry directly above or below the magnified area 164 moves into the magnified area 164. For example, FIG. 7 shows the main menu GUI 160 after a user has pressed the down arrow button 151 once. As shown in FIG. 7, the main menu listing 163 has been scrolled up and the "DVR" entry is now within the magnified area 164.

The magnified area 164 may be centered vertically within the first viewing pane 161, as shown in FIGS. 6-7. It will be recognized that the magnified area 164 may alternatively be positioned at any other location within the first viewing pane 161.

As shown in FIGS. 6-7, a filtered view of content related to the entry that is within the magnified area 164 may be displayed within the second viewing pane 162. For example, a content list 165 containing one or more selectable entries that are related to the entry that is within the magnified area 164 may be displayed within the second viewing pane 162. To illustrate, FIG. 6 shows a content list 165 related to the "Program Guide" entry that is within the magnified area 164. FIG. 7 shows that the content list 165 may be updated to include a number of entries related to the "DVR" entry when the "DVR" entry enters the magnified area 164.

In this manner, the second viewing pane 162 is configured to display a "preview" of content related to a particular entry located within the magnified area 164 before the entry is selected by the user. It will be recognized that the filtered view displayed within the second viewing pane 162 may alternatively include other types of content.

As mentioned, a user may select a desired entry within the main menu listing 163 by pressing the right arrow button 149 or the select button 152, shown in FIG. 4, when the desired entry is located within the magnified area 164. It will be recognized that a desired entry may be selected in any other manner as may serve a particular application. When an entry within the main menu listing 163 is selected, the content list 165 related to the selected entry is transferred from the second viewing pane 162 to the first viewing pane 161 and a new filtered view is displayed within the second viewing pane 162. As will be described in more detail below, the new filtered view may include a content list that is related to one of the entries within the content list 165.

Figure 8:
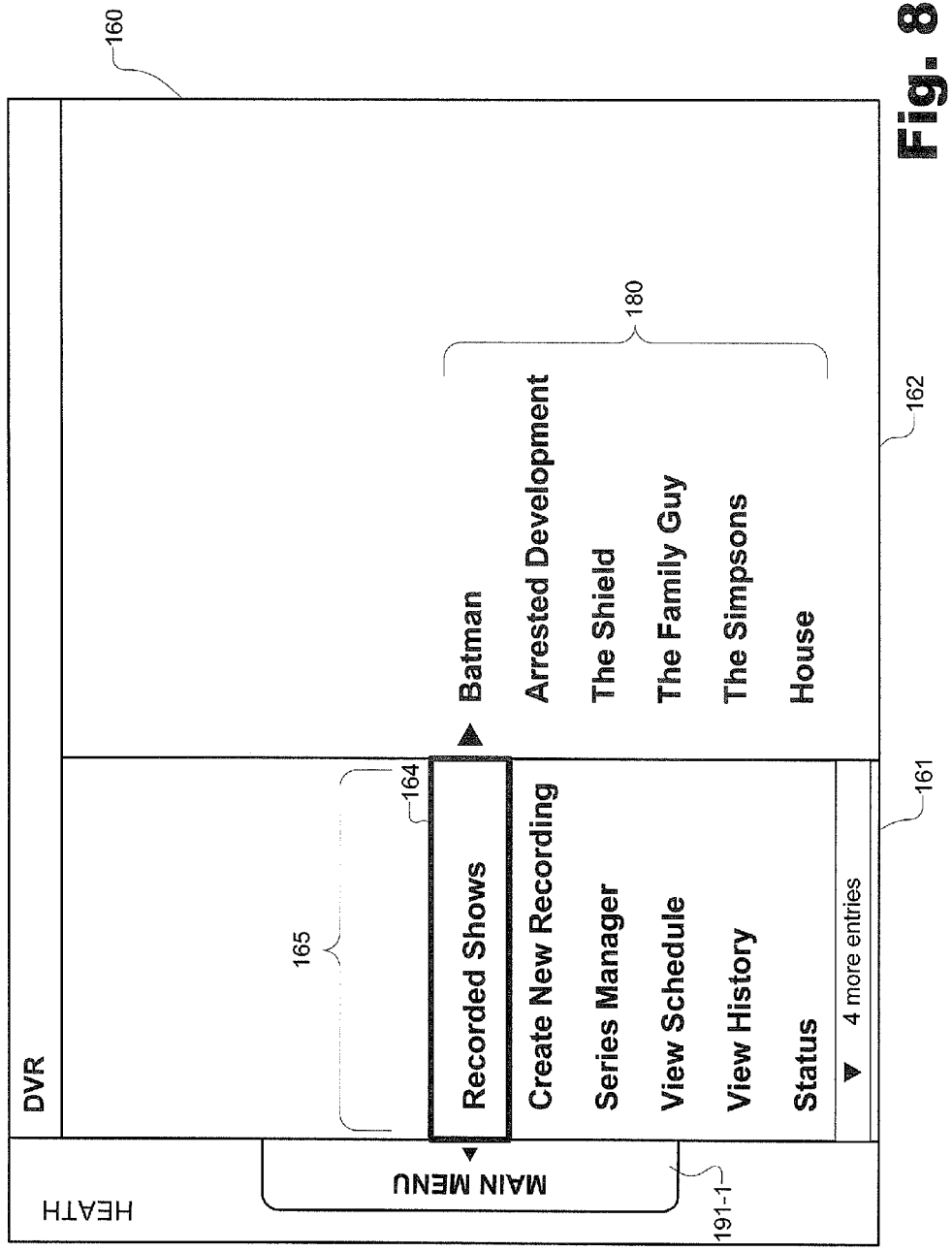
FIG. 8 shows the main menu GUI after a particular entry within a search results list has been selected according to principles described herein.

For example, FIG. 8 shows the main menu GUI 160 after the "DVR" entry has been selected. As shown in FIG. 8, content list 165 has been transferred to the first viewing pane 161. A user may then use the up and down arrow buttons 151 and 152 to browse through the content list 165.

When a particular entry within the content list 165 enters the magnified area 164, a filtered view of that entry appears in the second viewing pane 162 in a manner similar to that already described in connection with the main menu listing 163. For example, FIG. 8 shows that an entry labeled "Recorded Shows" is currently within the magnified area 164. Hence, a content list 180 containing a number of entries related to the "Recorded Shows" entry is displayed within the second viewing pane 162. The content list 180 may include, as shown in FIG. 8, a number of television shows that have been recorded by the user.

Figure 9:
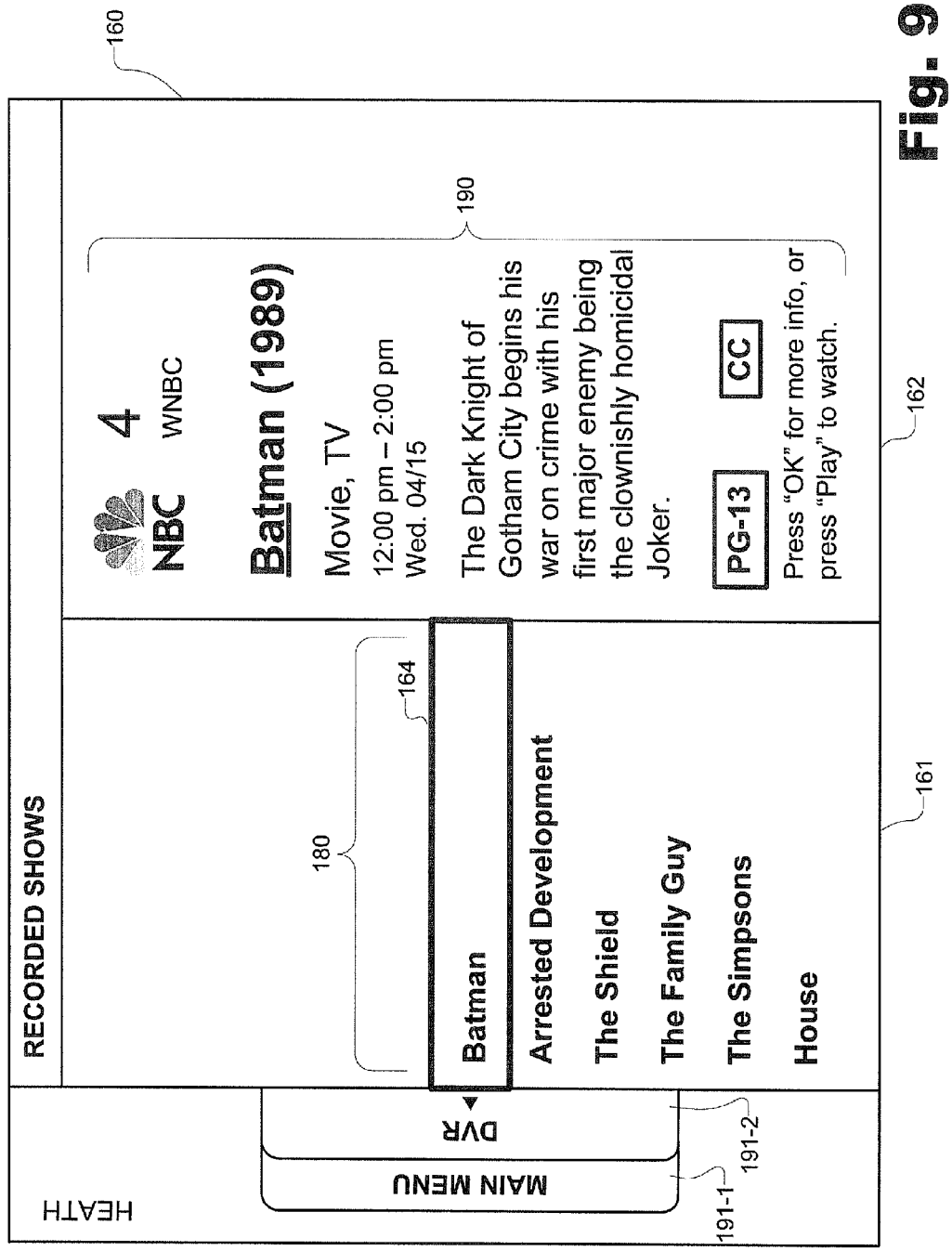
FIG. 9 shows another exemplary view of the main menu GUI according to principles described herein.

To select one of the entries within the content list 165, the user simply presses the right arrow button 149 or the select button 152 of FIG. 4 when the desired entry is located within the magnified area 164. For example, FIG. 9 shows the main menu GUI 160 after the "Recorded Shows" entry has been selected. As shown in FIG. 9, content list 180 has been transferred to the first viewing pane 161. The second viewing pane 162 may then display program information corresponding to an entry that is located within the magnified area 164. For example, the second viewing pane 162 illustrated in FIG. 9 shows program information 190 corresponding to "Batman," which entry is currently within the magnified area 164.

In some examples, as shown in FIGS. 8-9, one or more history tabs (e.g., 191-1 and 191-2, collectively referred to herein as 191) may be included within the main menu GUI 160. The history tabs 191 may be vertically oriented along the left-hand side of the first viewing pane 161, as shown in FIGS. 8-9. Additionally or alternatively, the history tabs 191 may be located and/or oriented in any other suitable manner.

The history tabs 191 are configured to graphically display the names of one or more hierarchical representations (e.g., directories) within a browsing path or thread created by a user during a particular browsing session. Each tab 191 may be selectable and may be labeled so that the user can easily go back to a particular directory within the browsing thread and select a different entry contained therein without having to restart the browsing thread.

To illustrate, FIG. 9 illustrates two exemplary history tabs 191-1 and 191-2. As indicated by the titles contained therein, history tab 191-1 corresponds to the "Main Menu" directory and history tab 191-2 corresponds to the "DVR" sub-directory within the "Main Menu" directory. Hence, to return to the "DVR" directory, a user may select the history tab 191-2 labeled "DVR" by, for example, pressing the left arrow button 148 once. Upon so doing, the main menu GUI 160 may be updated to display the view shown in FIG. 8. Alternatively, the user may press the left arrow button 148 twice to select the history tab 191-1 labeled "Main Menu" to return to the "Main Menu" directory. The main menu GUI 160 may accordingly be updated to display the view shown in FIG. 7.

A particular history tab 191 may be selected in a variety of different manners. For example, the left or right arrow buttons 148 or 149 may be pressed until the desired history tab (e.g., 191-1 or 191-2) is highlighted. The processing subsystem 110 may be configured to then select the desired history tab 191 after recognizing an absence of navigational input of a pre-determined length. Alternatively, the user may press the select button 152 or any other button that is a part of the user input device 113 after the desired history tab 191 is highlighted.

It will be recognized that as a user drills or goes deeper into a browsing thread, the screen space required to display the corresponding history tabs 191 increases. Hence, after a certain number of tabs 191 are displayed, it becomes infeasible to display more tabs 191 without encroaching on the screen space needed for the first and second viewing panes 161 and 162. In such a situation, in one approach, the nature of the tabs 191 may be changed (e.g., placed in a linear staggered manner using available vertical space adjacent the current placement of tabs 191-1 and 191-2).

Figure 10:
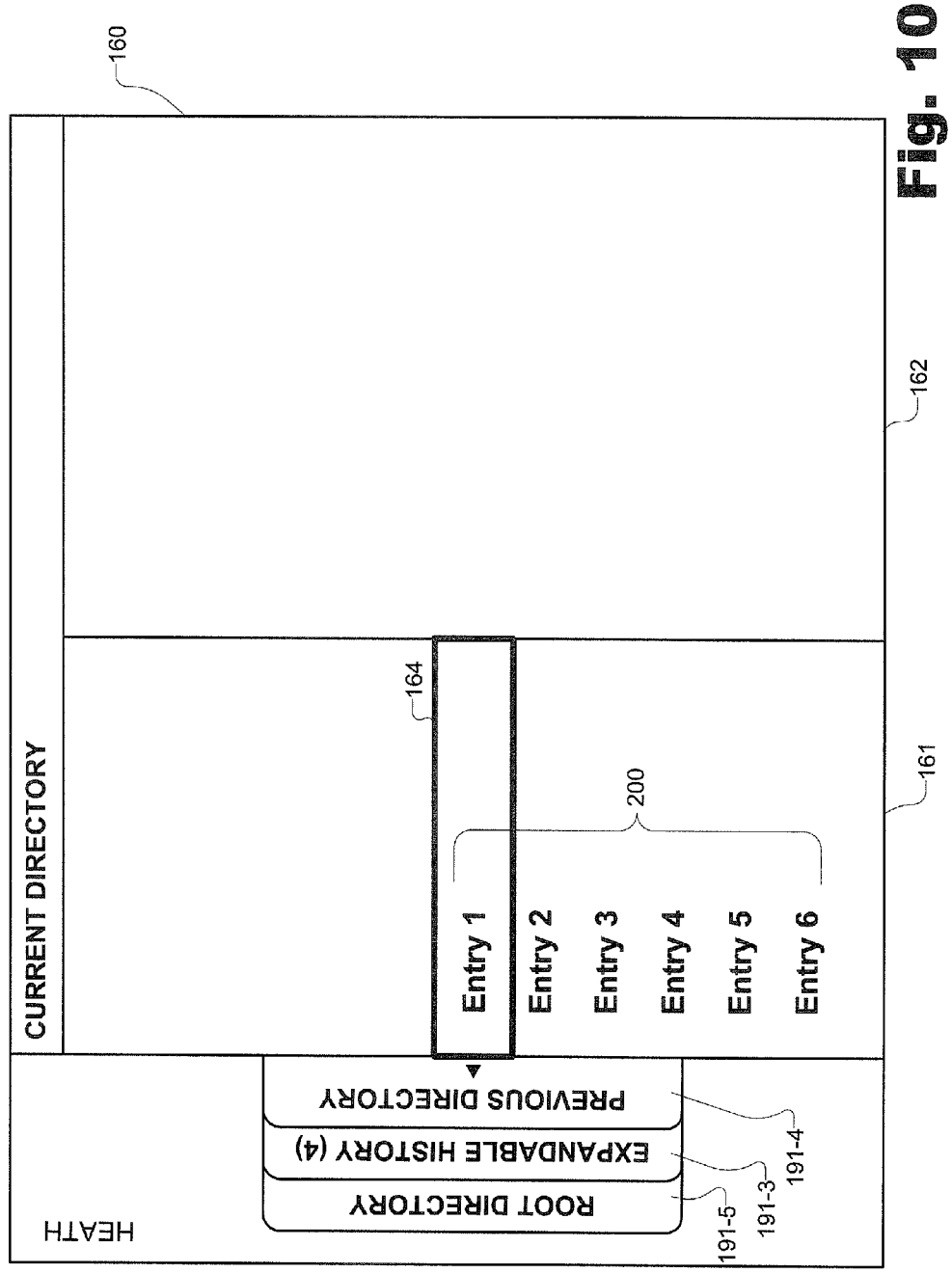
FIG. 10 shows an exemplary view of the main menu GUI with an expandable history tab according to principles described herein.

Alternatively, as shown in FIG. 10, a number of the history tabs 191 may be collapsed into an expandable history tab 191-3 after a pre-determined number of history tabs 191 are displayed. As will be described in more detail below, the expandable history tab 191-3 is configured to represent and facilitate access to a plurality of directories or other hierarchical representations within a browsing thread taken by a user during a particular browsing session. It will be recognized that the number of history tabs 191 that are displayed before the expandable history tab 191-3 is displayed may vary as may serve a particular application.

FIG. 10 illustrates an exemplary generic layout of the main menu GUI 160 wherein a number of history tabs 191, including an expandable history tab 191-3, are displayed. As shown in FIG. 10, a content list 200 located within a particular directory labeled "Current Directory" is displayed within the first viewing pane 161. In some examples, the content list 200 is located deep within a plurality of directories. Hence, the expandable history tab 191-3 graphically represents a plurality of directories within a particular browsing thread that cannot be graphically represented by corresponding history tabs 191 due to screen space limitations. For example, the expandable history tab 191-3 shown in FIG. 10 represents four directories within the path of the directory entitled "Current Directory," as indicated by the number displayed within the history tab 191-3.

As shown in FIG. 10, a history tab 191-4 corresponding to a directory that is previous to the currently displayed directory and a history tab 191-5 corresponding to a root directory may be displayed in conjunction with the expandable history tab 191-3. The root directory may include the main menu directory shown in FIGS. 6-7, for example.

In some examples, a user may select the expandable history tab 191-3 to backtrack or return to a particular directory within the browsing thread. The expandable history tab 191-3 may be selected by, for example, pressing the left arrow button 148 twice. However, it will be recognized that the expandable history tab 191-3 may be selected in any suitable manner as may serve a particular application.

The processing subsystem 110 may be configured to perform a variety of different operations when the expandable history tab 191-3 is selected. A number of these operations will be described in more detail below. However, it will be recognized that any other operation may be performed by the processing subsystem 110 when the expandable history tab 191-3 is selected as may serve a particular application.

Figure 11:
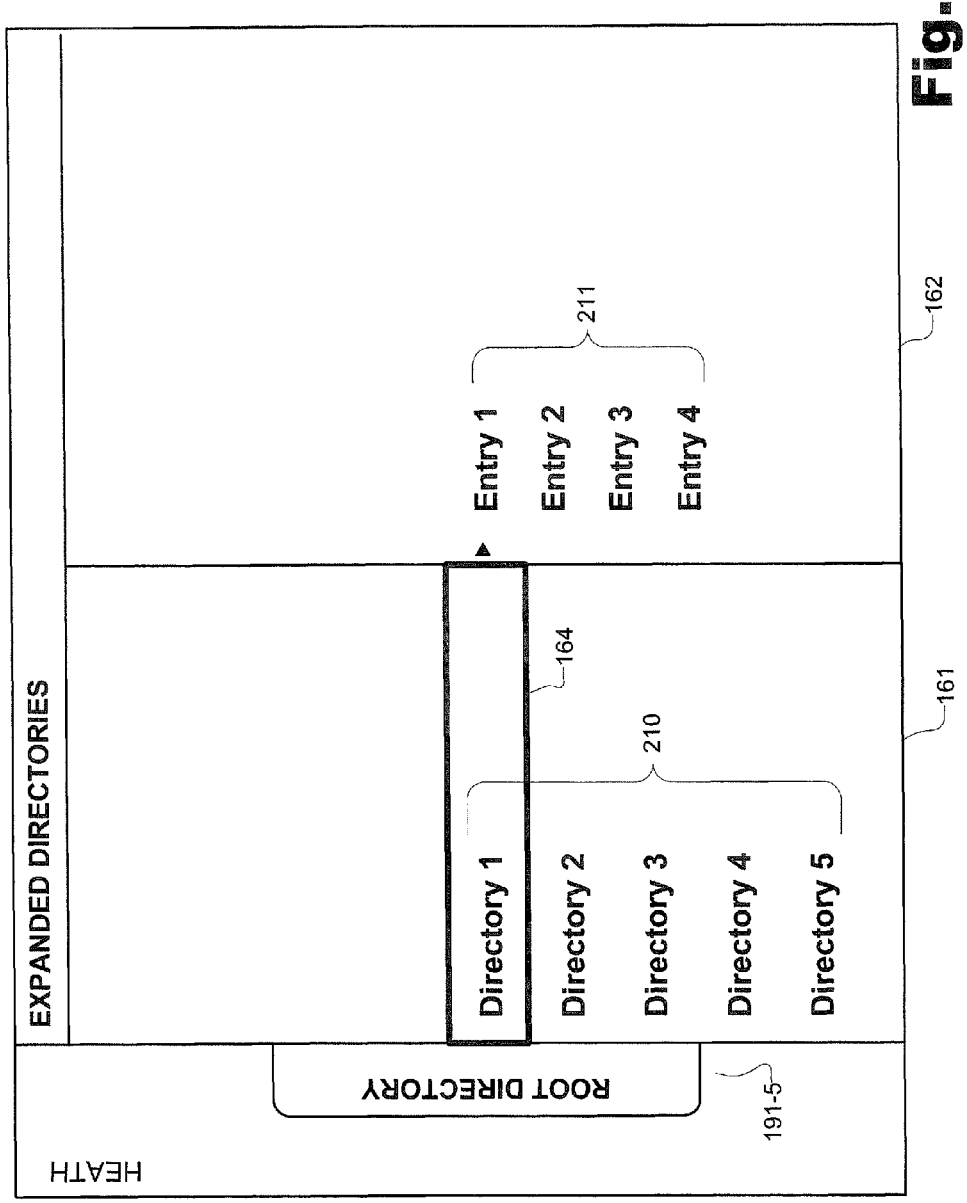
FIG. 11 shows the main menu GUI after the expandable history tab of FIG. 10 has been selected according to principles described herein.

In some examples, when the expandable history tab 191-3 is selected, a list of selectable names of one or more of the directories represented by the expandable history tab 191-3 may be displayed within one of the viewing panes 161 or 162. For example, FIG. 11 shows the main menu GUI 160 after the expandable history tab 191-3 has been selected by a user. As shown in FIG. 11, a list of directories 210 within a browsing path is displayed within the first viewing pane 161. The list 210 may include the names of one or more of the directories represented by the expandable history tab 191-3.

In some examples, the list 210 may additionally include the name of one or more directories that had been represented by one or more history tabs 191 prior to the selection of the expandable history tab 191-3. For example, the list 210 may include the name of the directory represented by history tab 191-4 shown in FIG. 10.

In some examples, each of the entries within the list of directories 210 may be selectively located within the magnified area 164. A filtered view of content 211 within a particular directory that is located within the magnified area 164 may be displayed in the second viewing pane 162 in a manner similar to that described hereinabove. In this manner, a user may scroll through the list of directories 210 and preview content within a desired directory by positioning the desired directory within the magnified area 164.

As mentioned, each of the entries within the list of directories 210 may be selectable. In this manner, a user may select one of the directories that corresponds to a desired point within the browsing thread to which the user desires to return.

In some examples, the user selects a particular directory by positioning the name of the directory within the magnified area 164 and pressing the right arrow button 149. However, it will be recognized that the directory may alternatively be selected using any other method as may serve a particular application.

Figure 12:
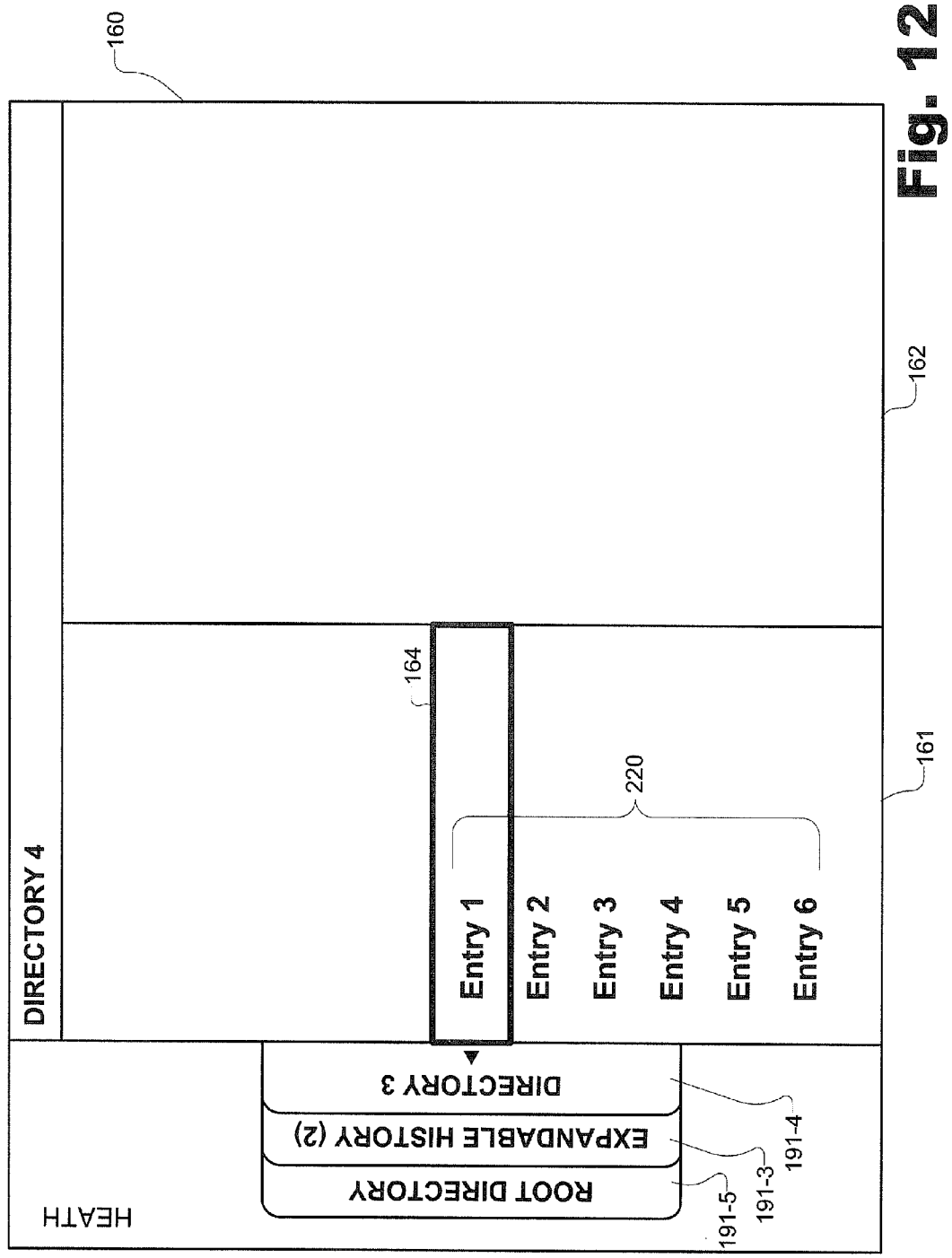
FIG. 12 shows another exemplary view of the main menu GUI according to principles described herein.

To illustrate, FIG. 12 shows the main menu GUI 160 after the directory labeled "DIRECTORY 4" has been selected by a user. As shown in FIG. 12, a list of entries within the directory is now displayed within the first viewing pane 161. In some examples, the expandable history tab 191-3 may again be displayed along with one or more additional history tabs (e.g., 191-4 and 191-5). As shown in FIG. 12, the number displayed within the expandable history tab 191-3 has been updated to reflect that the expandable history tab 191-3 now represents two hidden directories within the browsing path.

Figure 13:
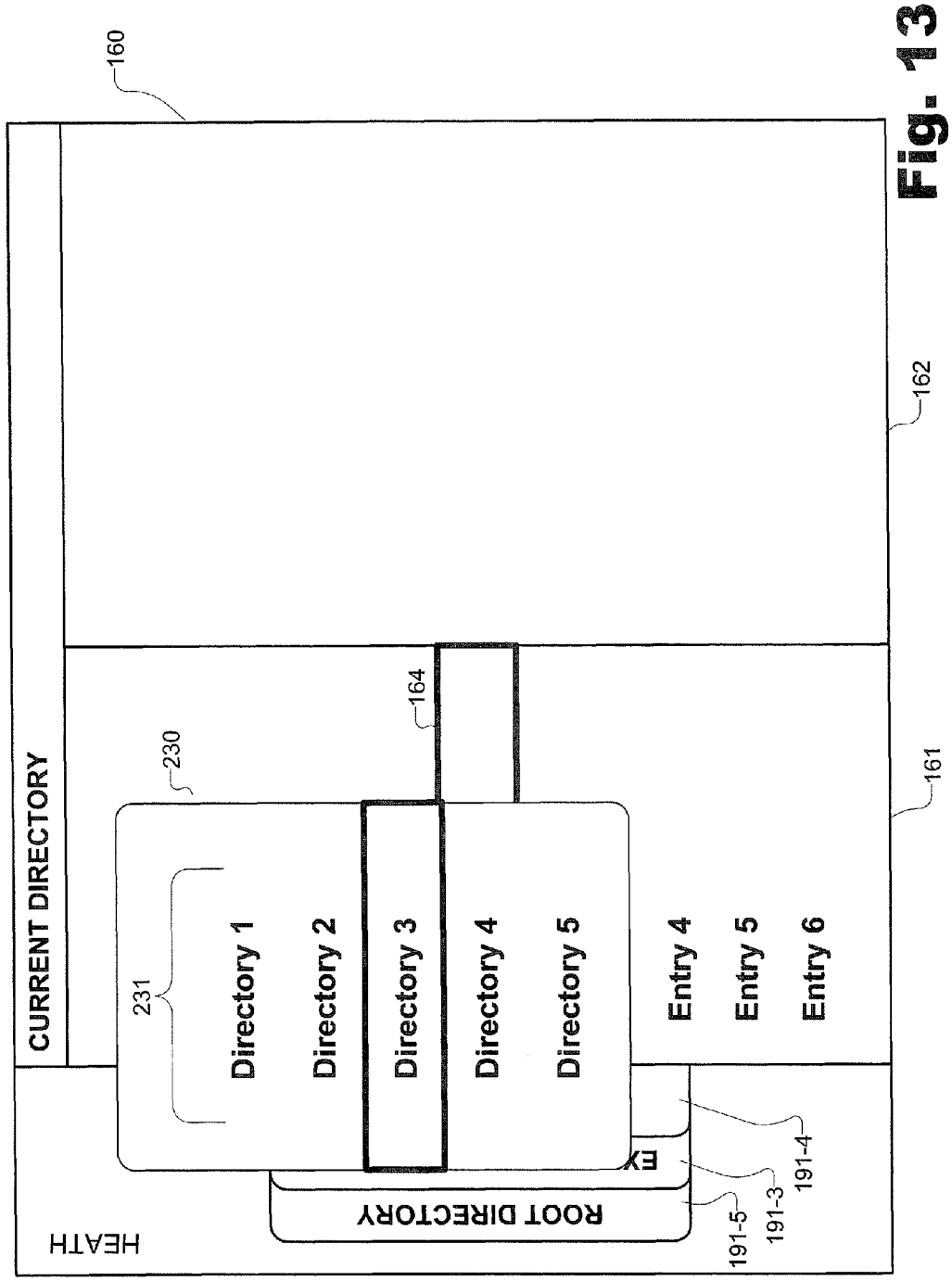
FIG. 13 shows a pop-up window that may be configured to appear after the expandable history tab of FIG. 10 is selected.

In some alternative examples, a pop-up window may be displayed when the expandable history tab 191-3 is selected by a user. For example, FIG. 13 shows a pop-up window 230 that may be configured to appear after the expandable history tab 191-3 is selected. As shown in FIG. 13, the pop-up window 230 may include a list of directories 231 similar to that described in connection with FIG. 10. The user may then scroll through the list 231 and select one of the directories that corresponds to a desired point within the browsing thread to which the user desires to return. After one of the directories is selected, the expandable history tab 191-3 may again be displayed as described above in connection with FIG. 12.

Figure 14:
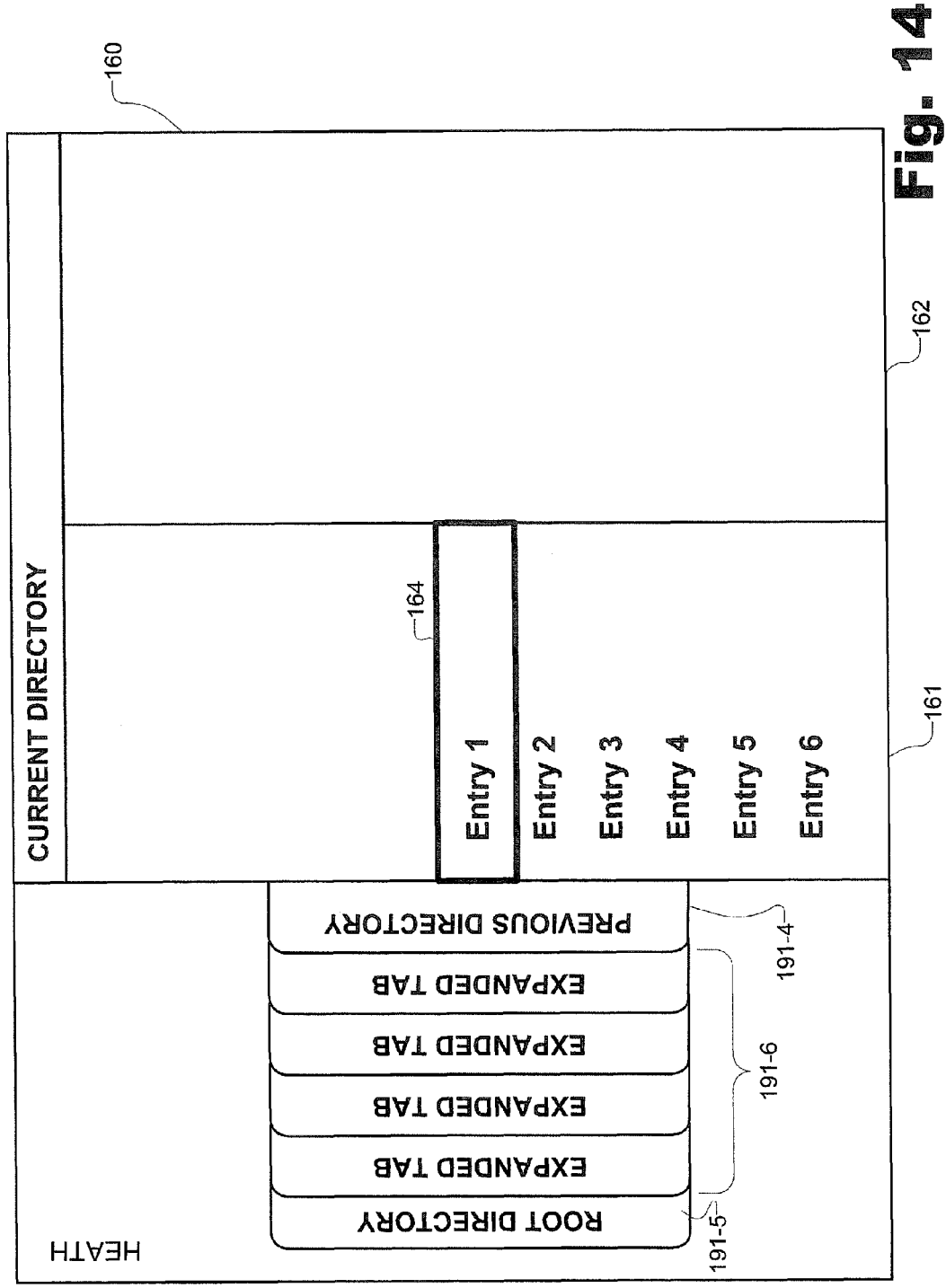
FIG. 14 shows an alternative view of the main menu GUI after the expandable history tab of FIG. 10 is selected according to principles described herein.

Alternatively, the expandable history tab 191-3 may be configured to expand and show a number of the hidden history tabs when selected by a user. The user may then select one of the hidden history tabs to return to a directory corresponding to the selected tab. For example, FIG. 14 shows the program guide GUI 160 of FIG. 10 after the expandable history tab 191-3 is selected by a user. As shown in FIG. 14, the expandable history tab 191-3 has been expanded into four history tabs 191-6. The user may then select one of the expanded history tabs 191-6 as desired in order to return to a desired point within the browsing thread.

An exemplary application wherein the expandable history tab 191-3 may be used is during a search for one or more media content instances available via the processing subsystem 110 will now be described. Exemplary search applications are described in further detail in co-pending U.S. patent application Ser. No. 11/542,402, entitled "INTERACTIVE SEARCH GRAPHICAL USER INTERFACE SYSTEMS AND METHODS," filed Oct. 3, 2006 and incorporated herein by reference in its entirety.

Figure 15:
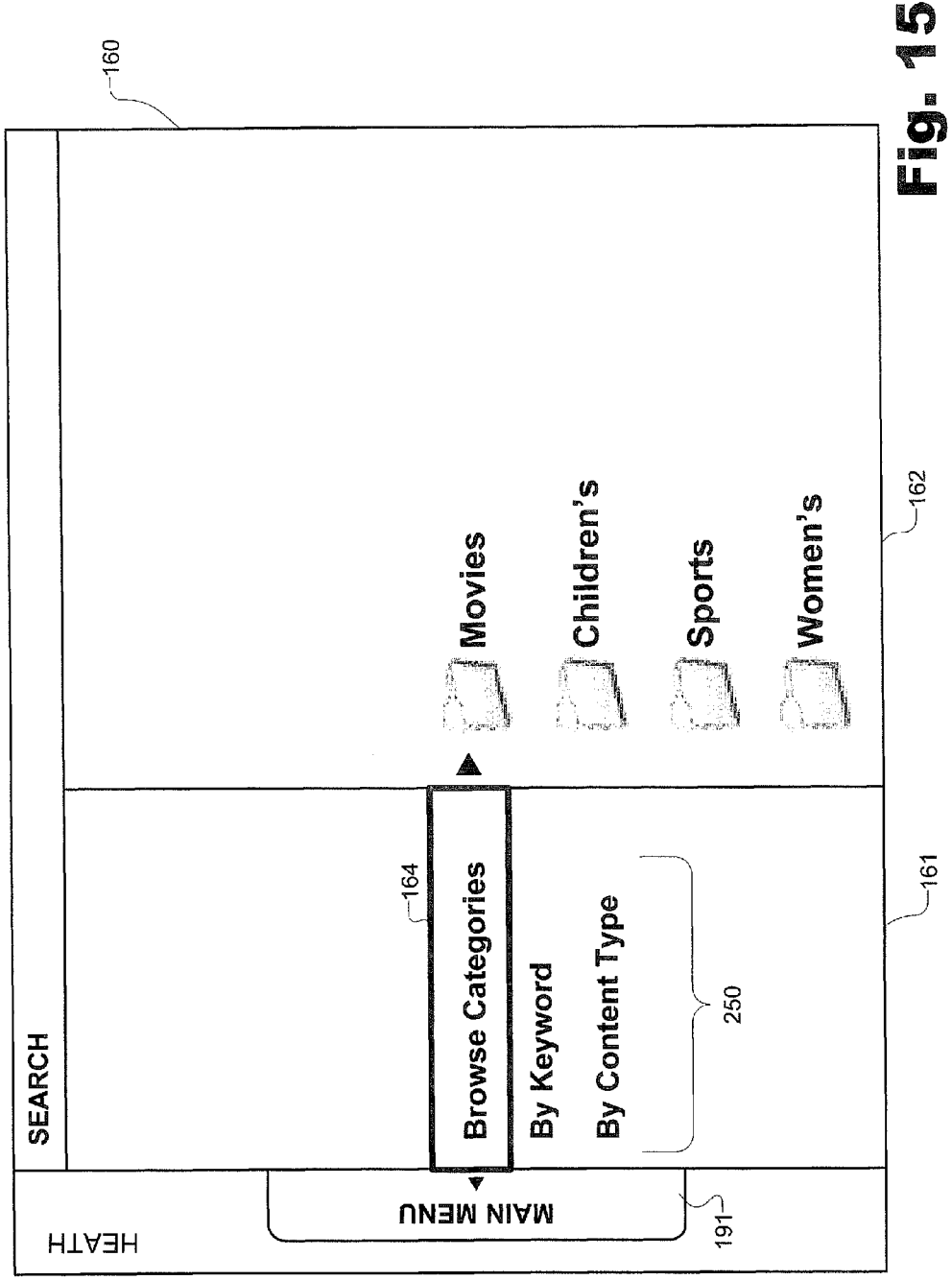
FIG. 15 shows another exemplary view of the main menu GUI according to principles described herein.

To search for one or more media content instances, a user may select, for example, the "search" entry within the main menu listing 163 of FIG. 6. FIG. 15 shows the main menu GUI 160 after the "search" entry has been selected. As shown in FIG. 15, a list 250 of various search options may be displayed in the first viewing pane 161. A user may search by category, keyword, content type, and/or any other criteria as may serve a particular example.

Figure 16:
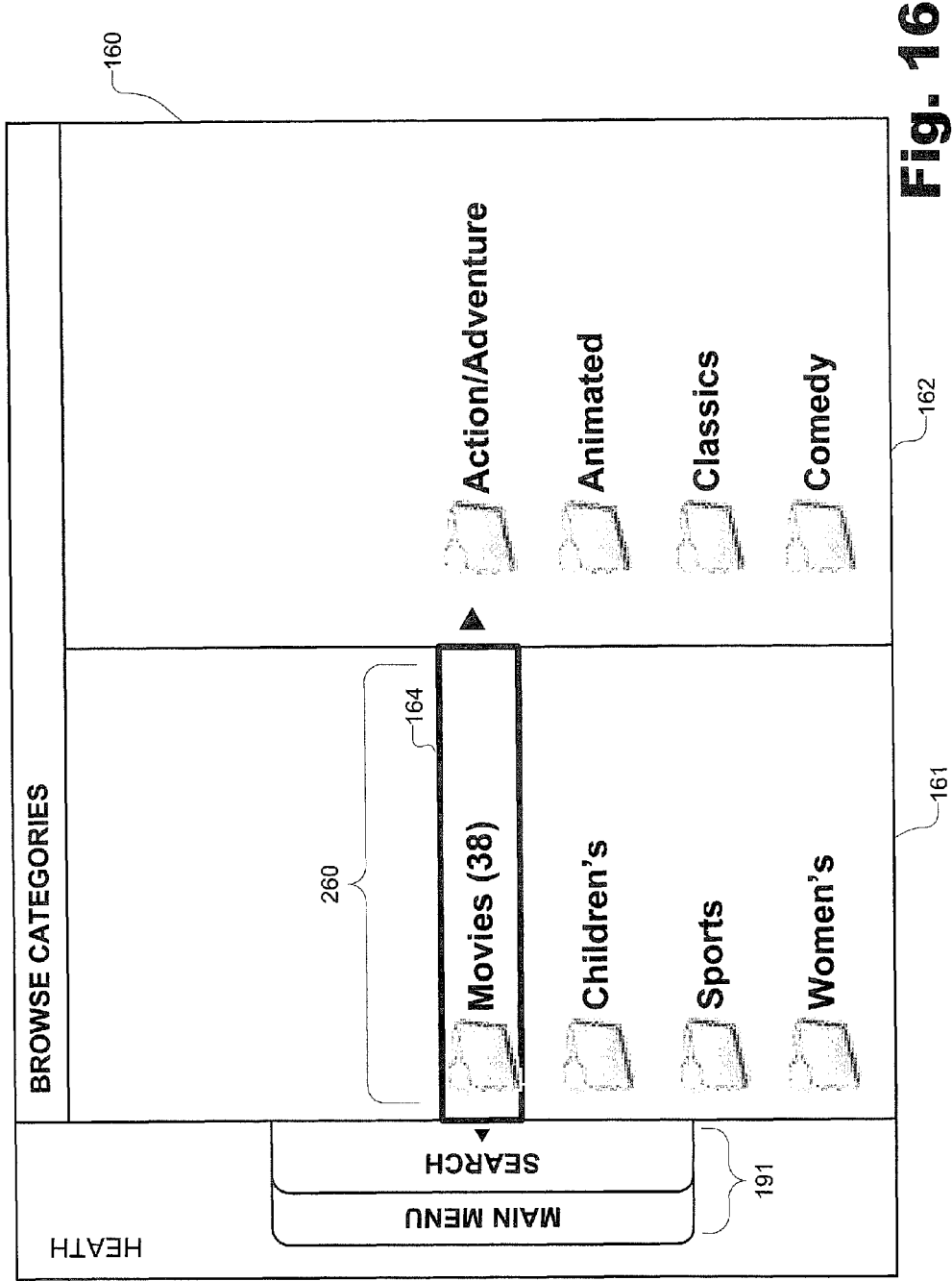
FIG. 16 shows another exemplary view of the main menu GUI according to principles described herein.

To search by category, for example, the user may simply press the right arrow button 149, as illustrated in FIG. 4, when the "browse categories" entry is within the magnified area 164. FIG. 16 shows the main menu GUI 160 after the "browse categories" entry has been selected. As shown in FIG. 16, a list of categories 260 is displayed within the first viewing pane 161. The list of categories 260 may include any suitable category such as, but not limited to, movies, children's content, sports content, and women's content.

Figure 17:
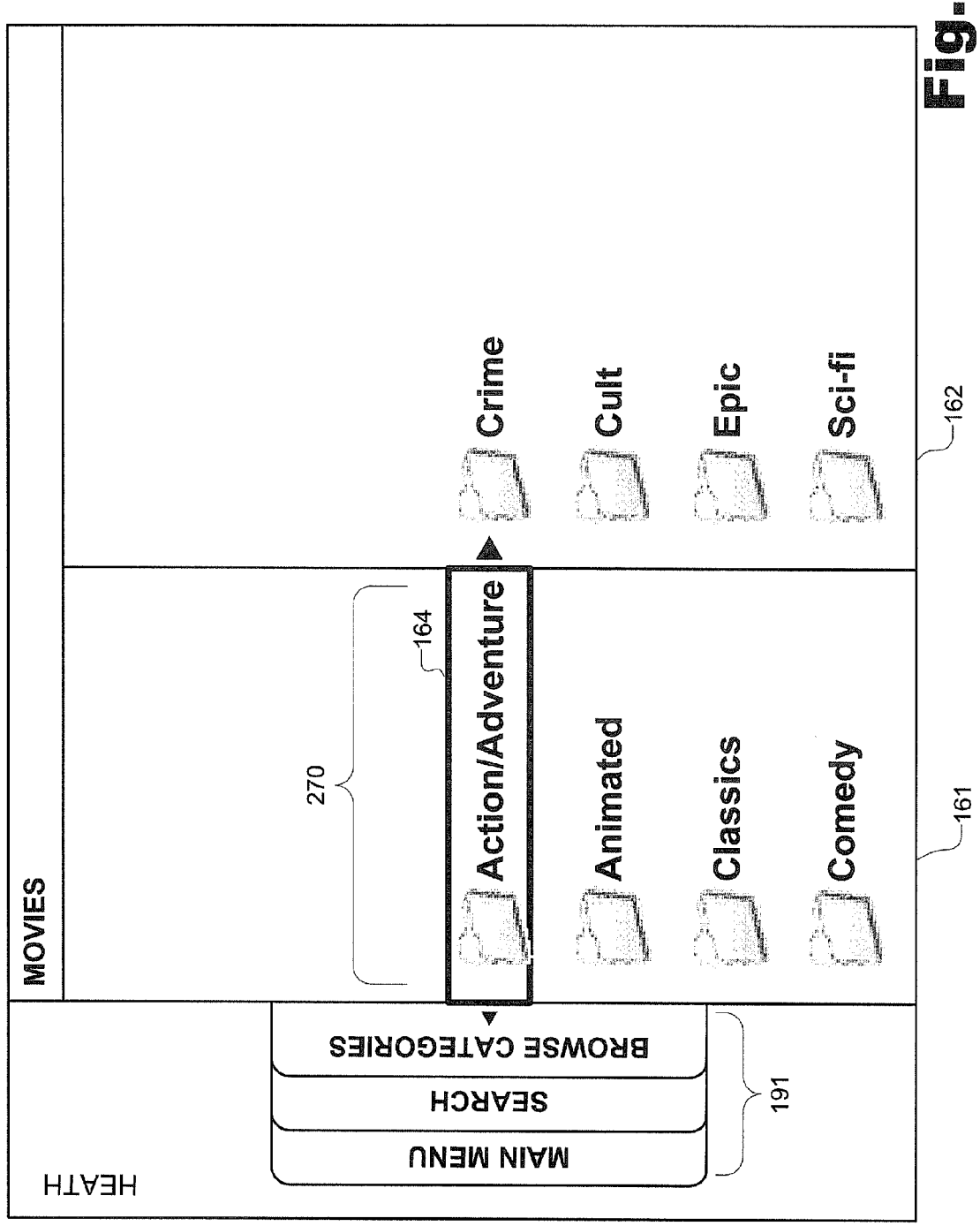
FIG. 17 shows another exemplary view of the main menu GUI according to principles described herein.

The user may select one of the categories within the list of categories 260 to continue searching for media content contained therein. For example, to search within the "movies" category, the user may simply press the right arrow button 149 in FIG. 4 while the "movies" entry is within the magnified area 164. FIG. 17 shows the main menu GUI 160 after the "movies" entry has been selected. As shown in FIG. 17, a list of categories 270 related to the "movies" entry is displayed within the first viewing pane 161. The user may continue to search through various sub-directories of movies in a manner similar to that described previously until a desired media content instance is located. For example, FIG. 18 shows the main menu GUI 160 after an "action/adventure" entry has been selected from the list of categories 270.

Figure 18:
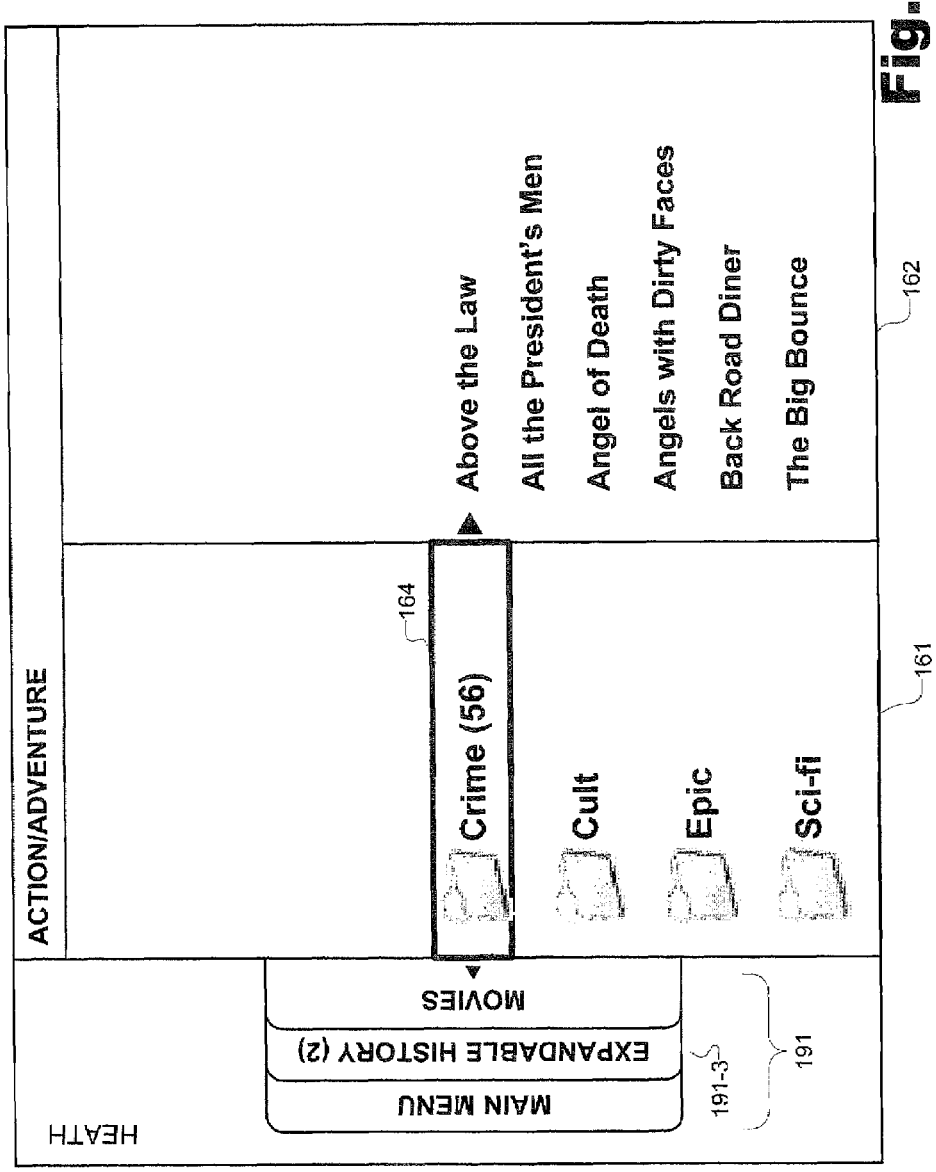
FIG. 18 shows another exemplary view of the main menu GUI according to principles described herein.

As shown in FIGS. 16-18, the history tabs 191 are updated each time the user selects a new directory within the browsing path. For example, FIG. 16 shows two history tabs 191 corresponding to the "main menu" and "search" directories. After the "movies" directory is selected, an additional history tab 191 is displayed corresponding to the "browse categories" directory, as shown in FIG. 17.

After a pre-defined number of history tabs 191 are displayed, the processing subsystem 110 may be configured to display the expandable history tab 191-3 to graphically represent a plurality of directories that cannot be represented by corresponding history tabs 191 due to screen space limitations. For example, the processing subsystem 100 may be configured to display the expandable history tab 191-3 after three history tabs 131 are displayed. To illustrate, the expandable history tab 191-3 may be displayed after the "action/adventure" directory is selected, as shown in FIG. 18. In this case, the expandable history tab 191-3 represents the "search" and "browse categories" directories.

In some examples, if a user desires to return to one of the directories represented by the expandable history tab 191-3 shown in FIG. 18, the user may simply select the expandable history tab 191-3. A column, pop-up window, or additional history tabs may be displayed as described hereinabove when the expandable history tab 191-3 is selected to allow the user to select one of the hidden directories.

III. Exemplary Process View

Figure 19:
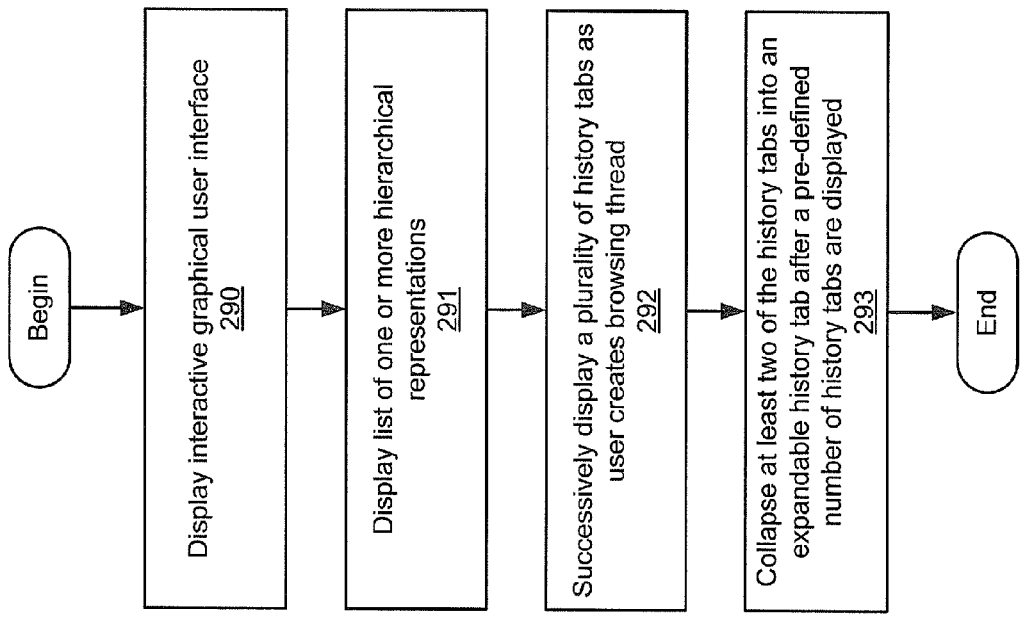
FIG. 19 illustrates an exemplary method of providing a capability of searching and/or browsing through content that may be available via the processing subsystem according to principles described herein.

FIG. 19 illustrates an exemplary method of providing a capability of searching and/or browsing through content that may be available via the processing subsystem 110. The steps shown in FIG. 19 are merely illustrative and may be omitted, added to, reordered, and/or modified in any way.

In step 290, an interactive graphical user interface is displayed on the viewing screen 155 of the display device 112 as shown in FIG. 5. The interactive graphical user interface may include the main menu GUI 160 described herein or any other graphical user interface as may serve a particular application.

A user may then use the interactive graphical user interface to search for and/or browse through content available via the processing subsystem 110. To this end, a list of one or more hierarchical representations (e.g., directories) is displayed by the interactive graphical user interface, as shown in step 291.

As the user selects various hierarchical representations displayed by the interactive graphical user interface, a browsing thread is created. A plurality of history tabs 191 are successively displayed while the browsing thread is created to graphically represent and facilitate access to one or more hierarchical representations within the browsing thread, as shown in step 292. After a pre-determined number of history tabs 191 are displayed, at least two of the history tabs 191 are collapsed into an expandable history tab 191-3, as shown in step 293. The expandable history tab 191-3 is configured to graphically represent and facilitate access to a plurality of the hierarchical representations within the browsing thread. In this manner, the user may easily return to a desired point within the browsing thread.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising: a media content processing subsystem comprising a graphics engine and a processor configured to successively display within a graphical user interface ("GUI") a first history tab graphically representing a first directory in response to a selection by a user of a second directory that does not already have a corresponding history tab displayed within the GUI, a second history tab graphically representing the second directory in response to a selection by the user of a third directory that does not already have a corresponding history tab displayed within the GUI, and a third history tab graphically representing the third directory in response to a selection by the user of a fourth directory that does not already have a corresponding history tab displayed within the GUI; automatically collapse, in response to the user selecting a fifth directory, the second and third history tabs into an expandable history tab configured to graphically represent and facilitate access to the second and third directories; and concurrently display within the GUI the first history tab, the expandable history tab, and a fourth history tab graphically representing the fourth directory in response to the user selecting the fifth directory; wherein each of the directories is representative of a particular group of content accessible by way of the media content processing subsystem.

2. The system of claim 1, wherein said GUI has at least a first viewing pane and a second viewing pane, and wherein said media content processing subsystem is further configured to:
display a list of said directories represented by said expandable history tab within said first viewing pane when said expandable history tab is selected.

3. The system of claim 2, wherein:
said media content processing subsystem is further configured to display a stationary magnified area within said first viewing pane;
wherein a name of a particular directory included in said directories represented by said expandable history tab is configured to be selectively located within said magnified area; and
wherein, when said name is located within said magnified area, said media content processing subsystem is further configured to display a list of entries corresponding to said particular directory within said second viewing pane.

4. The system of claim 3, wherein when said name is selected, said media content processing subsystem is further configured to transfer said display of said list of entries to said first viewing pane and display additional content within said second viewing pane, said additional content being related to one of said list of entries that is located within said magnified area.

5. The system of claim 1, wherein said media content processing subsystem is further configured to display a list of said directories represented by said expandable history tab within a pop-up window when said expandable history tab is selected.

6. The system of claim 1, wherein said media content processing subsystem is configured to expand the expandable history tab into the first and second history tabs and display the first and second history tabs in place of the expandable history tab in response to the user selecting the expandable history tab.

7. The system of claim 1, wherein said first history tab comprises a root history tab configured to represent a root directory within a browsing thread created by the user as the user successively selects the second through fifth directories.

8. The system of claim 1, further comprising:
a user input device comprising at least one navigational button, said user input device communicatively coupled to said media content processing subsystem and configured to control said media content processing subsystem;
wherein said at least one navigational button is configured to select said expandable history tab.

9. An apparatus comprising:
a graphics engine configured to display one or more graphics on a display device; and
a processor communicatively coupled to said graphics engine, said processor configured to cause said graphics engine to
successively display within a graphical user interface ("GUI") a first history tab graphically representing a first directory in response to a selection by a user of a second directory that does not already have a corresponding history tab displayed within the GUI, a second history tab graphically representing the second directory in response to a selection by the user of a third directory that does not already have a corresponding history tab displayed within the GUI, and a third history tab graphically representing the third directory in response to a selection by the user of a fourth directory that does not already have a corresponding history tab displayed within the GUI;
automatically collapse, in response to the user selecting a fifth directory, the second and third history tabs into an expandable history tab configured to graphically represent and facilitate access to the second and third directories; and
concurrently display within the GUI the first history tab, the expandable history tab, and a fourth history tab graphically representing the fourth directory in response to the user selecting the fifth directory;
wherein each of the directories is representative of a particular group of content accessible by way of the media content processing subsystem.

10. The apparatus of claim 9, wherein said GUI has at least a first viewing pane and a second viewing pane, and wherein said processor is further configured to cause said graphics engine to:
display a list of said directories represented by said expandable history tab within said first viewing pane when said expandable history tab is selected.

11. The apparatus of claim 10, wherein:
said processor is further configured to cause said graphics engine to display a stationary magnified area within said first viewing pane;
wherein a name of a particular directory included in said directories represented by said expandable history tab is configured to be selectively located within said magnified area; and wherein, when said name is located within said magnified area, said media content processing subsystem is further configured to display a list of entries corresponding to said particular directory within said second viewing pane.

12. The apparatus of claim 11, wherein when said name is selected, said media content processing subsystem is further configured to transfer said display of said list of entries to said first viewing pane and display additional content within said second viewing pane, said additional content being related to one of said list of entries that is located within said magnified area.

13. The apparatus of claim 11, wherein said magnified area comprises a fixed focus state with at least one distinguishing feature.

14. The apparatus of claim 9, wherein said processor is further configured to cause said graphics engine to display a list of said directories that are represented by said expandable history tab within a pop-up window when said expandable history tab is selected.

15. The apparatus of claim 9, wherein said expandable history tab is configured to expand into the first and second history tabs and display the first and second history tabs in place of the expandable history tab in response to the user selecting the expandable history tab.

16. The apparatus of claim 9, wherein said first history tab comprises a root history tab configured to represent a root directory within a browsing thread created by the user as the user successively selects the second through fifth directories.

17. A method comprising:
successively displaying within a graphical user interface ("GUI"), by a media content processing subsystem, a first history tab graphically representing a first directory in response to a selection by a user of a second directory that does not already have a corresponding history tab displayed within the GUI, a second history tab graphically representing the second directory in response to a selection by the user of a third directory that does not already have a corresponding history tab displayed within the GUI, and a third history tab graphically representing the third directory in response to a selection by the user of a fourth directory that does not already have a corresponding history tab displayed within the GUI;
automatically collapsing, by the media content processing subsystem in response to the user selecting a fifth directory, the second and third history tabs into an expandable history tab configured to graphically represent and facilitate access to the second and third directories;
concurrently displaying within the GUI, by the media content processing subsystem, the first history tab, the expandable history tab, and a fourth history tab graphically representing the fourth directory in response to the user selecting the fifth directory;
wherein each of the directories is representative of a particular group of content accessible by way of the media content processing subsystem.

18. The method of claim 17, wherein said GUI has at least a first viewing pane and a second viewing pane, and wherein the method further comprises:
displaying, by the media content processing subsystem in response to a selection by the user of the expandable history tab, a list of said directories represented by said expandable history tab within said first viewing pane.

19. The method of claim 18, further comprising:
displaying, by the media content processing subsystem, a stationary magnified area within said first viewing pane; and
wherein a name of a particular directory included in said directories represented by said expandable history tab is configured to be selectively located within said magnified area; and
wherein, when said name is located within said magnified area, said method further comprises displaying, by the media content processing subsystem, a list of entries corresponding to said particular directory within said second viewing pane.

20. The method of claim 17, further comprising displaying, by the media content processing subsystem in response to a selection by the user of the expandable history tab, a list of said directories represented by said expandable history tab within a pop-up window.

21. The method of claim 17, further comprising:
expanding, by the media content processing subsystem in response to a selection by the user of the expandable history tab, said expandable history tab into the first and second history tabs and display the first and second history tabs in place of the expandable history tab.

22. The system of claim 1, wherein:
the second directory comprises a subdirectory of the first directory;
the third directory comprises a subdirectory of the second directory;
the fourth directory comprises a subdirectory of the third directory; and
the fifth directory comprises a subdirectory of the fourth directory.

23. The system of claim 1, wherein the media content processing subsystem is further configured to:
automatically collapse the fourth history tab into the expandable history tab to create an updated expandable history tab in response to the user selecting a sixth directory; and
concurrently display the first history tab, the updated expandable history tab, and a fifth history tab graphically representing the fifth directory in response to the user selecting the sixth directory.

24. The system of claim 1, wherein the content accessible by way of the media content processing subsystem comprises media content accessible by way of a subscriber television network.

25. The method of claim 17, wherein:
the second directory comprises a subdirectory of the first directory;
the third directory comprises a subdirectory of the second directory;
the fourth directory comprises a subdirectory of the third directory; and
the fifth directory comprises a subdirectory of the fourth directory.

26. The method of claim 17, further comprising:
automatically collapsing, by the media content processing subsystem, the fourth history tab into the expandable history tab to create an updated expandable history tab in response to the user selecting a sixth directory; and
concurrently displaying, by the media content processing subsystem, the first history tab, the updated expandable history tab, and a fifth history tab graphically representing the fifth directory in response to the user selecting the sixth directory.

* * * * *